United States Patent [19]

Aihara et al.

[11] Patent Number: 4,930,460
[45] Date of Patent: Jun. 5, 1990

[54] ENGINE ROOM-COOLING CONTROL SYSTEM

[75] Inventors: Yasuyuki Aihara; Shigeki Baba; Eitetsu Akiyama; Tatsumi Sawada, all of Wako, Japan

[73] Assignee: Honda Giken Kogyo Kabushiki Kaisha, Tokyo, Japan

[21] Appl. No.: 289,371

[22] Filed: Dec. 23, 1988

[30] Foreign Application Priority Data

Dec. 28, 1987 [JP] Japan .......................... 62-199409[U]
Dec. 28, 1987 [JP] Japan ................................ 62-332922
Aug. 1, 1988 [JP] Japan ................................ 63-193166
Aug. 1, 1988 [JP] Japan ................................ 63-193167

[51] Int. Cl.$^5$ .............................................. F01P 7/10
[52] U.S. Cl. ............................. 723/41.49; 123/41.31
[58] Field of Search ............... 123/41.11, 41.12, 41.49, 123/41.58, 41.65, 41.31; 62/133

[56] References Cited

U.S. PATENT DOCUMENTS

| | | | |
|---|---|---|---|
| 3,964,444 | 6/1976 | Hemmann et al. | 123/41.12 |
| 4,168,456 | 9/1979 | Isobe | 123/41.12 |
| 4,409,933 | 10/1983 | Inoue | 123/41.12 |
| 4,765,284 | 8/1988 | Kanazawa et al. | 123/41.49 |
| 4,774,910 | 10/1988 | Aihara et al. | 123/41.12 |

FOREIGN PATENT DOCUMENTS 50-37473 10/1975 Japan.
55-34101 8/1980 Japan.

*Primary Examiner*—Noah P. Kamen
*Attorney, Agent, or Firm*—Lyon & Lyon

[57] ABSTRACT

A control system for controlling the air-cooling of an engine room accommodating an engine. The control system carries out air-cooling by the use of at least one of first and second electric fans. The control system operates the fan(s) when stoppage of the engine is detected and at the same time a temperature of the engine detected by a sensor is higher than a predetermined value.

17 Claims, 11 Drawing Sheets

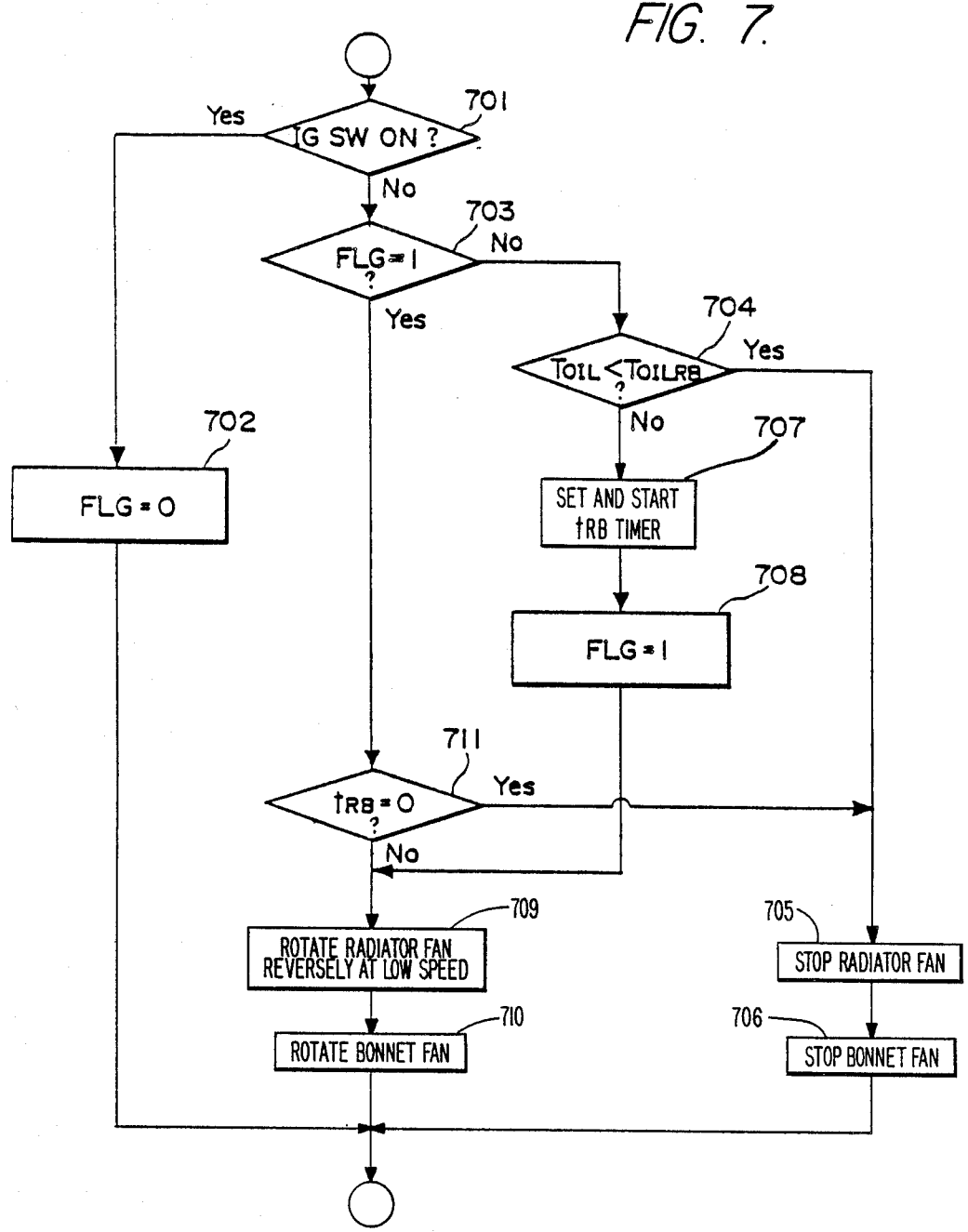

ENGINE ROOM-COOLING CONTROL SYSTEM

BACKGROUND OF THE INVENTION

The present invention relates to an engine room-cooling control system, which is adapted to cool the engine room in an improved manner after stoppage of the engine.

Conventionally, as a system for cooling the engine room of an automotive vehicle, a ventilating system has been proposed by Japanese Utility Model Publication (Kokoku) No. 55-34101, which comprises an electric fan which is mounted on a bonnet etc. for auxiliary ventilating purposes and is driven depending on the engine room temperature or the engine coolant temperature. The ventilating system is applied to an automotive vehicle where a radiator fan is mechanically connected to the drive shaft of the engine to compensate for decrease in the amount of cooling air supplied by the radiator fan under certain operating conditions of the engine such as idling.

However, the conventional system cannot properly cool the engine room after stoppage of the engine. More specifically, when the engine is stopped, the radiator fan, which is mechanically associated therewith, is also stopped, and air cooling by the radiator fan cannot be carried out. Further, after stoppage of the engine, the aforesaid auxiliarly electric fan is started and stopped only manually by the driver of the vehicle. Therefore, the driver must stay in the vehicle.

Further, the start and stop of the electric fan depends on judgement by the driver as to whether or not the engine room is under a condition which necessitates air-cooling. Therefore, it is very difficult to carry out cooling of the engine room in response to the magnitude of load on the engine immediately before stoppage of the engine.

More specifically, the magnitude of load on the engine immediately before stoppage of the engine has a great influence on the temperature of the engine room and the rate of increase in the temperature immediately after stoppage of the engine. The temperature of the engine room and the rate of increase in the temperature are higher as the load on the engine immediately before stoppage of the engine is heavier. Therefore, in order to carry out accurate control of air-cooling of the engine room, the load on the engine, air stream which has been produced by running of the vehicle and has struck thereon, etc. must be taken into consideration. However, it is difficult for the driver to accurately decide the start and stop of the engine by taking the above-described factors into consideration, and hence the conventional system cannot properly carry out control of air-cooling of the engine room after stoppage of the engine.

Further, a cooling system in which a fan for cooling the engine can be reversely rotated has been proposed by Japanese Utility Model Publication (Kokoku) No. 50-37473. However, the reverse rotation of the fan in the cooling system is only for prevention of excessive cooling of the engine.

SUMMARY OF THE INVENTION

It is an object of the invention to provide an engine room-cooling control system which is capable of cooling the engine room in a proper and efficient manner after stoppage of the engine.

It is a further object of the invention to provide an engine room-cooling control system which is capable of cooling the engine room in a manner depending on the magnitude of load on the engine immediately before stoppage thereof.

It is another object of the invention to provide an engine room-cooling control system which is capable of cooling the engine room properly and efficiently even after the engine has been stopped, restarted, and stopped again, within a short time period.

According to the invention, there is provided a control system for controlling the cooling of an engine room accommodating an engine, comprising:

first detecting means for detecting stoppage of the engine;

cooling fan means arranged in the engine room for cooling same;

second detecting means for detecting a temperature of the engine; and control means for operating the cooling fan means when the first detecting means has detected the stoppage of the engine and at the same time the temperature of the engine detected by the second detecting means is higher than a predetermined value.

Preferably, the control system includes a timer for determining whether or not a predetermined time period has elapsed after stoppage of the engine, and wherein the control means operates the cooling fan means over the time period determined by the timer.

More preferably, the second detecting means detects at least one of the temperature of lubricating oil in the engine and the temperature of engine coolant as the temperature of the engine.

Also preferably, the cooling fan means comprises a first cooling fan arranged at a first location in the engine room for cooling the engine, and a second cooling fan arranged at a second location in the engine room.

More preferably, the control means causes one of the first and second cooling fans to be driven for rotation in a direction such that air is discharged from the engine room to the outside thereof, and the other of the first and second cooling fans in a direction such that air is introduced into the engine room from the outside thereof.

Also preferably, the first cooling fan is disposed to be selectively driven for rotation either at a predetermined high speed or at a predetermined low speed, and the control means causes the first cooling fan to be driven for rotation at the predetermined low speed after stoppage of the engine.

More preferably, the first cooling fan of the cooling fan means is a radiator fan for cooling the engine.

Preferably, the control means causes the cooling fan means to be driven for rotation irrespective of whether or not the temperature of the engine is higher than the predetermined value, when the engine has been restarted and stopped again before the predetermined time period elapses after the timer has been started.

Preferably, the control system is associated with an air-conditioning unit, the air-conditioning unit having a condenser fan arranged in the engine room, a switch being closable for turning on the air-conditioning unit, and a compressor;

the cooling fan means comprising a cooling fan capable of being selectively driven for forward and reverse rotation, the condenser fan being interconnected with the cooling fan for rotation together therewith;

the control means including means for causing the cooling fan to be driven for forward rotation during operation of the engine and causing same to be driven for reverse rotation during stoppage of the engine, and means for inhibiting operation of the air-conditioning unit responsive to closing of the switch of the air-conditioning unit until a predetermined time period elapses after stoppage of reverse rotation of the cooling fan, even if the switch of the air-conditioning unit has been closed, during transition from reverse rotation of the cooling fan to forward rotation thereof when the engine is restarted after stoppage thereof.

More preferably, the control means includes means for causing the cooling fan to be driven for forward rotation at a speed depending on the pressure of refrigerant in the compressor of the air-conditioning unit, after the predetermined time period has elapsed.

Still more preferably, the control means causes the cooling fan to be driven for forward rotation at a higher speed as the pressure of the refrigerant in the compressor of the air-conditioning unit is higher.

The above and other objects, features, and advantages of the invention will be more apparent from the ensuing detailed description taken in conjunction with the accompanying drawings.

BRIEF DESCRIPTION OF THE DRAWINGS

FIG. 7 is a flowchart showing a subroutine for controlling the operation of fans after stoppage of the engine according to a first embodiment of the invention;

DETAILED DESCRIPTION

The invention will now be described in detail with reference to the drawings showing embodiments thereof.

Figure 1:
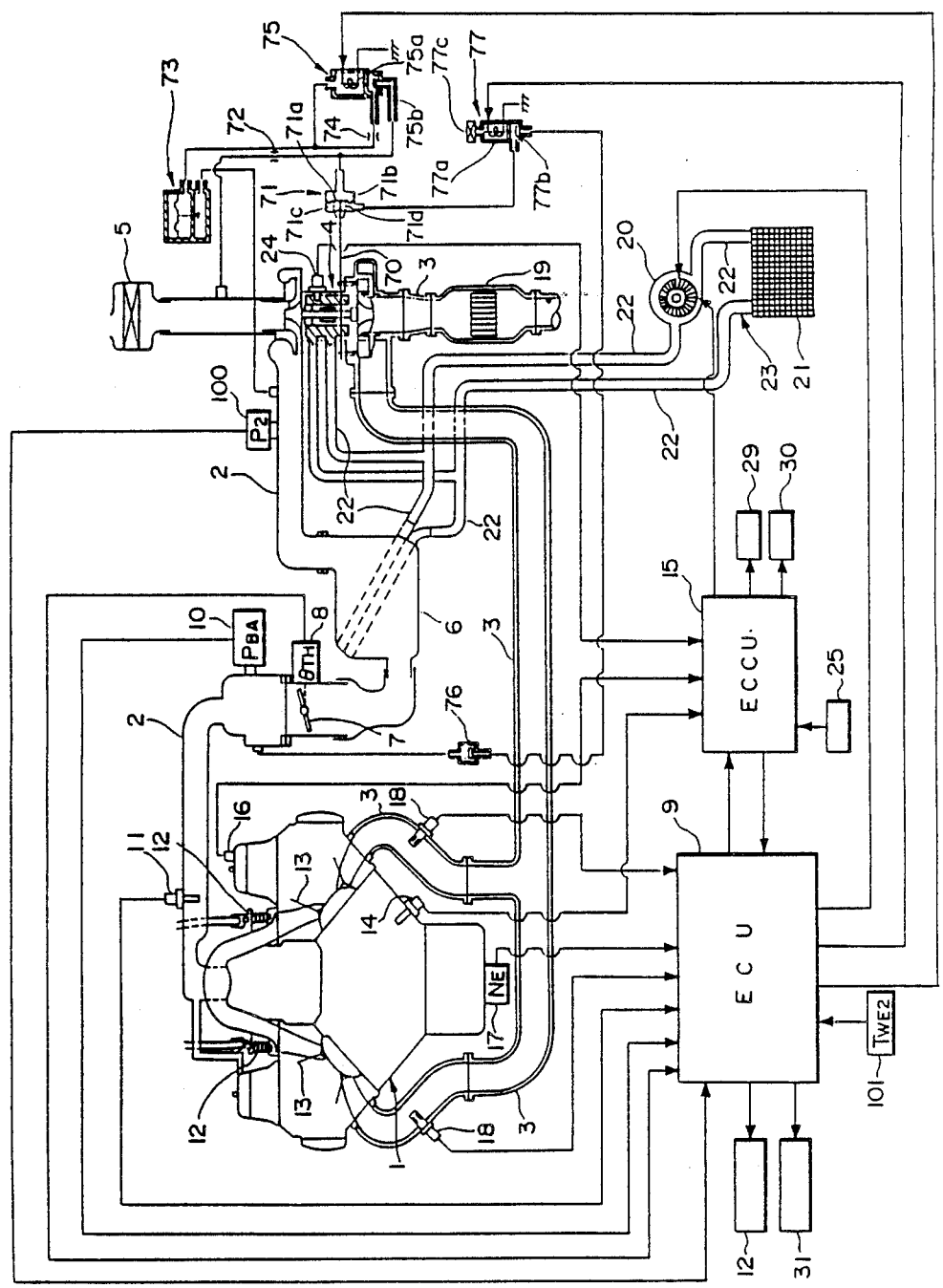
FIG. 1 is a schematic diagram of the whole arrangement of a fuel supply control system of an internal combustion engine to which the engine room-cooling control system according to the invention is applied.

Referring first to FIG. 1, there is illustrated the whole arrangement of a fuel supply control system for an internal combustion engine, to which the engine room-cooling control system according to the invention is applied. In the figure, the engine is equipped with a supercharger, more specifically, a water-cooled turbocharger. Reference numeral 1 designates an internal combustion engine which may be a six-cylinder type, for instance. The engine has an intake pipe 2 connected to an upstream side thereof, and an exhaust pipe 3 connected to a downstream side thereof. The turbocharger 4 is arranged intermediately between the intake pipe 2 and the exhaust pipe 3.

In the intake pipe 2, there are provided an air-cleaner 5, an intercooler 6, and a throttle valve 7 in the order mentioned as viewed from the upstream side.

A supercharging pressure ($P_2$) sensor 100 is arranged between the turbocharger 4 and the intercooler 6, and supplies a signal indicative of the detected supercharging pressure to an electronic control unit (hereinafter referred to as "the ECU") 9.

Connected to the throttle valve 7 is a throttle valve opening ($\theta$th) sensor 8, which detects the throttle valve opening ($\theta$th), converts the detected throttle valve opening ($\theta$th) into an electrical signal, and supplies the signal to the ECU 9.

Arranged at a location downstream of the throttle valve 7 is an intake pipe absolute pressure ($P_{BA}$) sensor 10, which detects absolute pressure in the intake pipe, converts the detected intake pipe absolute pressure ($P_{BA}$) into an electrical signal, and supplies the signal to the ECU 9. An intake air temperature ($T_A$) sensor 11 is provided at a location downstream of the intake pipe absolute pressure ($P_{BA}$) sesnor 10, which detects intake air temperature ($T_A$), and supplies a signal indicative of the detected temperature ($T_A$) to the ECU 9.

Fuel injection valves 12, two of which are shown, are arranged in the intake pipe 2 intermediately between the engine 1 and the throttle valve 7, each at a location slightly upstream of a corresponding intake valve 13, for each cylinder. Each fuel injection valve is connected to a fuel tank, not shown, and also electrically connected to the ECU 9 so that its opening valve period, i.e. the amount of fuel to be supplied to the engine 1, is controlled by a driving signal from the ECU 9.

First and second engine coolant temperature ($T_W$) sensors (hereinafter respectively referred to as "the $T_{WE1}$ sensor" and "the $T_{WE2}$ sensor") 14, 101, which may be formed of a thermistor or the like, are mounted in the cylinder block of the engine in a manner embedded in the peripheral wall of an engine cylinder having its interior filled with coolant, to detect engine coolant temperature ($T_W$), and supply electrical signals indicative of the detected engine coolant temperature ($T_W$) to an electronic cooling control unit for controlling the cooling of the engine room (hereinafter referred to as "the ECCU") described below and the ECU 9, respectively.

An lubricating oil temperature sensor (hereinafter referred to as "the $T_{OIL}$ sensor") for detecting lubricating oil temperature is mounted in the cylinder block of the engine 1, and supplies a signal indicative of the detected lubricating oil temperature to the ECCU 15.

An engine rotational speed speed sensor (hereinafter referred to as "the Ne sensor") 17 is arranged in facing relation to a camshaft, not shown, of the engine 1 or a crankshaft, not shown, of same. The Ne sensor is adapted to generate a pulse of a top-dead-center (TDC) position signal (hereinafter referred to as "the TDC signal") at a predetermined crank angle postion of each cylinder of the engine which comes a predetermined crank angle earlier relative to the top-dead-center (TDC) position at which the suction stroke thereof starts, whenever the engine crankshaft rotates through 120 degrees. The TDC signal pulses generated by the Ne sensor are supplied to the ECU 9.

02 sensors 18, 18 are inserted in the exhaust pipe 3 at locations immediately downstream of the engine 1 for detecting the concentration of oxygen ($O_2$) in the exhaust gases and supplying an electrical signal indicative of the detected oxygen concentration to the ECU 9. At a location downstream of the turbocharge 4 in the exhaust pipe 3, there is arranged a three-way catalyst 19 for purifying ingredients HC, CO, and NOx contained in the exhaust gases.

The turbocharger 4 is, as described in detail hereinbelow, is a variable capacity type, to which is connected a conduit line 22 across which are provided a water pump 20 and a subradiator 21. More specifically, the water pump 20, the subradiator 21 and the conduit line 22 copperate to form a cooling system 23 for cooling the water-cooled turbocharger which is provided independently of a cooling system, not shown, for cooling the engine 1. Cooling water or coolant supplied by the cooling system 23 circulates in a water jacket 57 (shown in FIG. 3) formed within a lubricating part casing 43, referred to hereinafter, of the turbocharger 4 to thereby cool the turbocharger 4. Further, the conduit line 22 is bifurcated into two branches, one of which extends through the intercooler 6 for cooling the intake air taken in through the intercooler 6. In the cooling system 23, at a location immediately downstream of the turbocharger 4, there is arranged a turbocharger-coolant temperature sensor (hereinafter referred to as "the $T_{WT}$ sensor") 24 for detecting the temperature of coolant for the turbocharger and supplying an electrical signal indicative of the detected turbocharger-coolant temperature to the ECCU 15. An ignition switch 25 is also electrically connected to the ECCU 15 to supply same with an electrical signal indicative of the ON or OFF state of the ignition switch 25.

Figure 2:
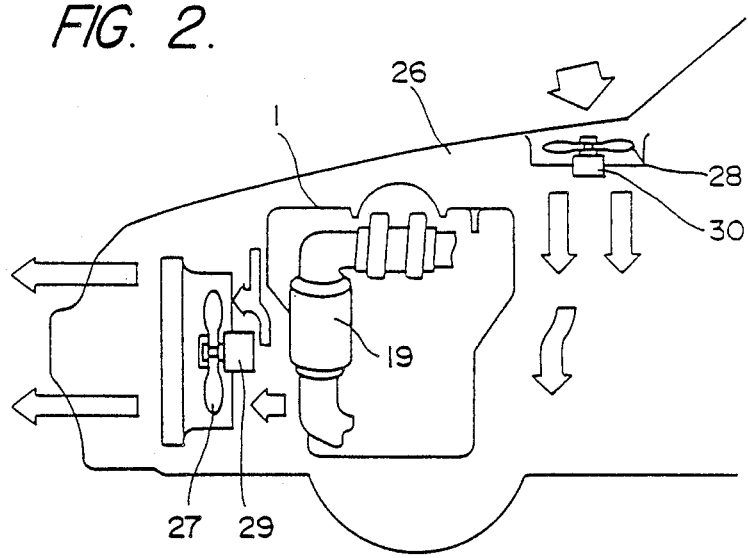
FIG. 2 is a schematic diagram illustrating an engine room of an automotive vehicle on which the engine of FIG. 1 is installed.

Further, as shown in FIG. 2, within an engine room 26, a radiator fan 27 is arranged at a front portion thereof for blowing air in the forward or backward direction, and a bonnet fan 28 is arranged at a rear upper portion thereof for blowing air in the downward direction. The radiator fan 27 is driven by a first motor 29, and can be adjusted with respect to the direction and speed of rotation of the fan. The bonnet fan 28 is driven by a second motor 30.

Figure 3:
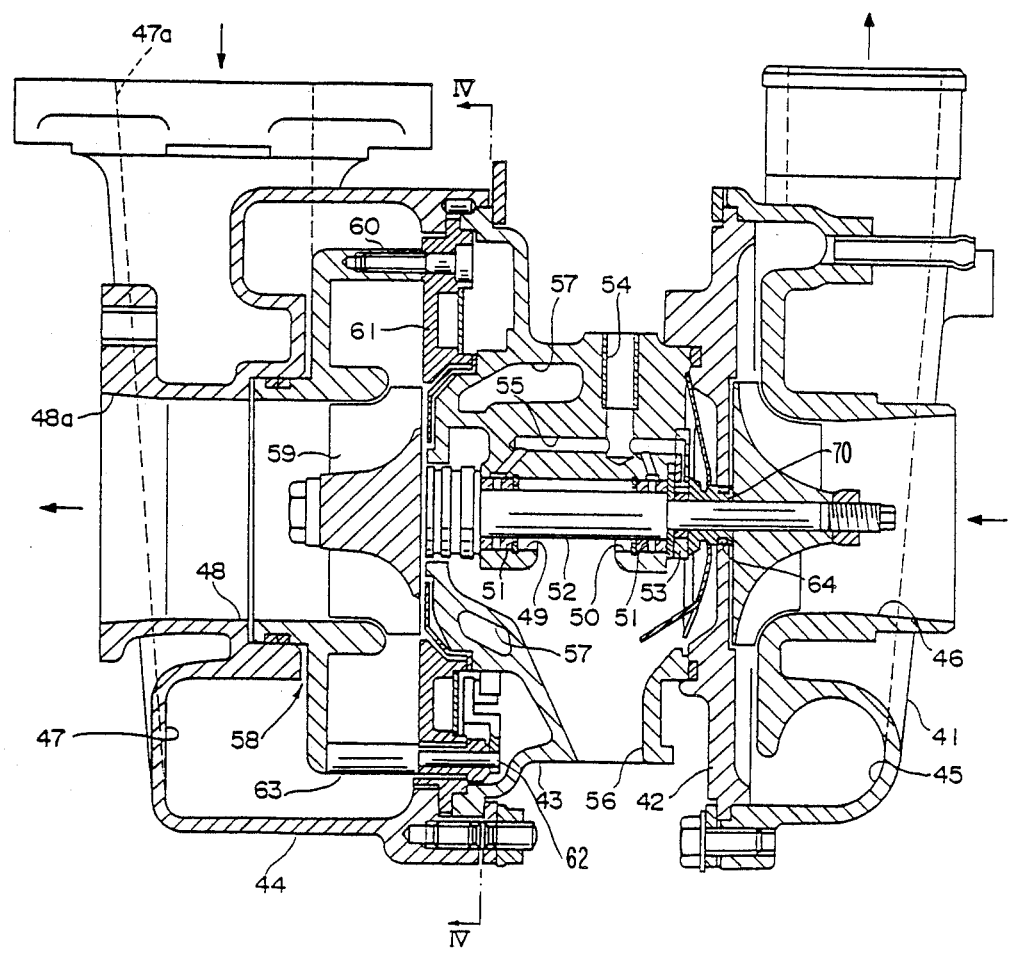
FIG. 3 is a longitudinal cross-sectional view of a turbocharger appearing in FIG. 1.

FIG. 3 shows the whole construction of the turbocharger 4, which comprises a housing formed of a compressor casing 41 constituting a scroll of a compressor part, and a back plate 42 closing the back side of the compressor casing 41, the aforementioned lubricating part casing 43 supporting therein a main shaft 52 of the turbocharger 4, and a turbine casing 44 constituting a scroll of a turbine part.

The compressor casing 41 is formed therein with a scroll passage 45 connected to the intake pipe 2, and an axial passage 46, the former serving as an intake air outlet and the latter as an intake air inlet.

The turbine casing 44 is formed therein with a scroll passage 47 having an inlet opening 47a tangetially extending thereto, an outlet passage 48 which extends in an axial direction and has an outlet opening 48a, with the inlet opening 47a and the outlet opening 48a being connected to the exhaust pipe 3.

Bearing holes 49, 50 are formed in the lubricating part casing 43, in which the main shaft 52 is received and supported, by radial bearings 51, 51. A thrust bearing 53 is interposed between the back plate 42 and an opposed end face of the lubricating casing 43.

A lubricating oil inlet port 54 is formed in an upper side portion, as viewed in FIG. 3, of the lubricating part casing 43 for delivering lubricating oil which is supplied from a lubricating oil pump, not shown, so as to be commonly used for the turbocharger 4 and the engine 1, to the radial bearings 51, 51 and the thrust bearing 53 by way of a lubricating oil passage 55 formed in the lubricating part casing 43. Lubricating oil from lubricated parts is drained through a lubricating oil outlet port 56 formed in the lubricating part casing 43, and collected into an oil sump, not shown.

In order to prevent the lubricating oil supplied to the thrust bearing 53 from flowing into the compressor side, a seal ring 64 is provided in a through hole formed in a central portion of the back plate 42 through which a bushing 70 fitted on the main shaft 52 extends.

The water jacket 57 is formed within the lubricating part casing 43. The water jacket 57 has an annular cross-section at a portion closer to the turbine casing 44, and a U-shaped cross-section at a portion corresponding to an upper side portion of the lubricating part casing 43 as viewed from FIG. 3, and is connected, to the conduit line 22 extending from the cooling system 23 for the turbocharger 4 so that cooling water circulates therein to thereby cool the turbocharger 4.

Figure 4:
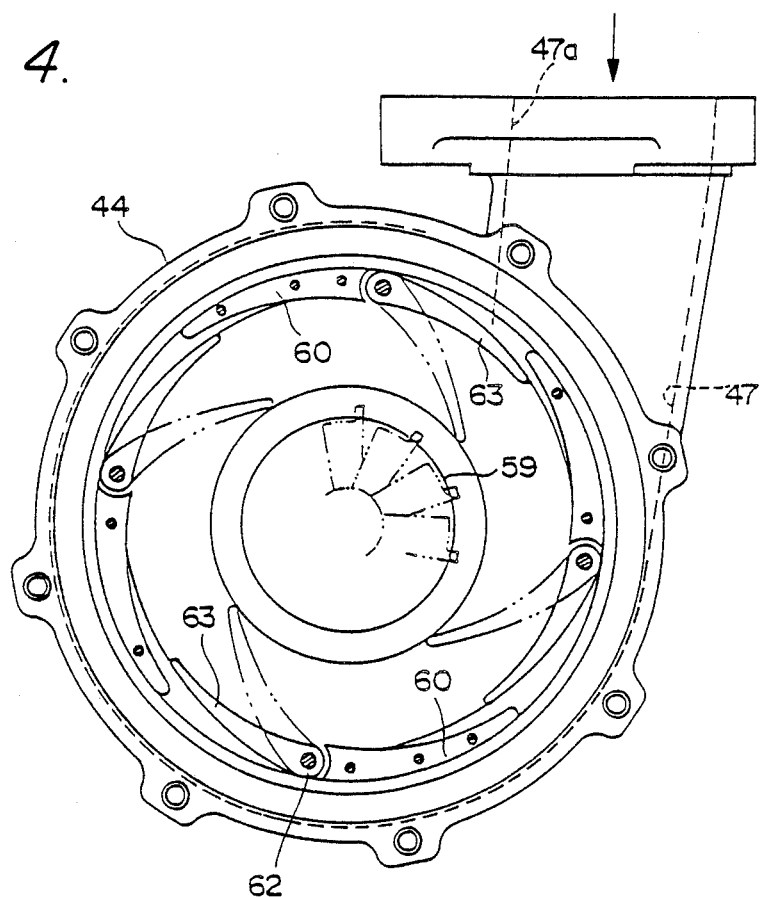
FIG. 4 is a transverse cross-sectional view taken on line IV—IV of FIG. 3.

As shown in FIG. 4, a stationary vane member 58 is arranged in a central portion of the scroll passage 47, which has a peripheral portion thereof formed with four stationary vanes 60 concentrically surrounding a turbine wheel 59. These stationary vanes are arcuate in shape and are circumferentially arranged at equal intervals with each other.

Disposed between adjacent stationary vanes 60 are movable vanes 63 with one-ends thereof secured to respective rotary pins 62 rotatably supported by the back plate 61. All the movable vanes 54 are pivotable simultaneously with each other to adjust the area of space (hereinafter called "space area") between adjacent stationary vanes 60.

Each movable vane 63 is also arcuate in shape, with almost the same curvature as the stationary vanes 60, and pivotable between a fully closed position shown by the solid line in FIG. 4 and a fully open position shown by the chain line in the figure.

The rotary pins 62 are operatively connected to an actuator 71 in FIG. 1 by means of a driving rod 70 appearing in FIG. 1 so that the movable vanes 63 are simultaneously controlled to open and close by the actuator 60.

When the driving rod 70 is shifted in its extending direction (leftward as viewed in FIG. 1), the opening degree of the movable vanes 63 is decreased to thereby increase the space area between adjacent movable and stationary vanes, whereas when the rod 70 is shifted in its receding direction (rightward as viewed in FIG. 1), the opening degree of the movable vanes 63 is increased to thereby decrease the space area between adjacent movable and stationary vanes. Thus, the opening degree of the movable vanes 63 is controlled to adjust the capacity of the turbocharger.

The actuator 71 has, as shown in FIG. 1, a first pressure chamber 71b and a second pressure chamber 71c separated from each other by a diaphragm 71a. The driving rod 70 penetrates a housing wall of the actuator 71 and is connected to the diaphragm 71a on the second pressure chamber 71c side. A spring 71d is mounted in the second pressure chamber 71c for biasing the diaphragm in a direction such that the driving rod 70 is receded, i.e. in a direction such that the opening degree of the movable vanes 63 is increased.

Connected to the first pressure chamber 71 are a portion of the intake passage between the air cleaner 5 and the turbocharger 4 by way of a restriction 22, and a portion of the intake passage between the intercooler 6 and the turbocharger 4 by way of a regulator 73, a restriction 74, and a control valve 75 for introducing supercharging pressure into the chamber 71.

The control valve 75 for introducing supercharging pressure is a normally-closed ON-OFF two position type electromagnetic valve which comprises a solenoid 75a, and a valve body 75b which is opened upon energization of the solenoid 75a. When the solenoid 75a is energized to open the valve body 75b, supercharging pressure $P_2$ within the intake passage between the intercooler 6 and the turbocharger 4 is introduced into the first pressure chamber 71b of the actuator 71.

Accordingly, the magnitude of supercharging pressure is controlled by controlling the ON-OFF duty ratio $D_1$ of the solenoid 75a of the control valve 75.

In the meanwhile, connected to the second pressure chamber 71c of the actuator 71 is a portion of the intake passage downstream of the throttle valve 7 by way of a constant pressure valve 76 and a control valve 77 for introducing negative pressure into the chamber 71c. The control valve 77 for introducing negative pressure is, similarly to the control valve 75 for introducing supercharging pressure, a normally-closed ON-OFF two position type electromagnetic valve which comprises a solenoid 77a, and a valve body 77b. When the solenoid 77a is energized to open the valve body 77b, negative pressure regulated to a constant value by the constant pressure valve 76 is introduced into the second pressure chamber 71c, whereas when the solenoid 77a is deenergized to close the valve body 77b, the atmosphere is introduced into the second pressure chamber 71c by way of the air cleaner 77c.

Accordingly, supercharging pressure $P_2$ is also controlled by controlling the ON-OFF duty ratio $D_2$ of the solenoid 77a of the control valve 77.

The solenoids 75a, 77a of the control valves 75, 77 are connected to the ECU 9, and the duty ratios $D_1$, $D_2$ are controlled by signals therefrom.

The ECU 9, which operates when the engine 1 is in operation, determines operating conditions of the engine 1 based on input signals from various parameter sensors, calculates a fuel injection period $T_{OUT}$ for fuel injection valves 12, timing of ignition of an ignition device 31, etc. so as to optimize operating characteristics of the engine, such as fuel consumption and accelerabirity, based on the determined operating conditions, and supplies driving signals based on the results of calculation to the fuel injection valves 12 and the ignition device 31. More specifically, the ECU 9 comprises an input circuit which carries out waveform-shaping and analog/digital (A/D) conversion of input signals from the $\theta$th sensor 8, $P_{BA}$ sensor 10, $T_A$ sensor 11, $T_{WE2}$ sensor 101, Ne sensor 17, $O_2$ sensor 18, $P_2$ sensor 100, etc., a central processing unit (CPU), memory means storing programs to be executed in the CPU for calculation of the fuel injection periods, determination of abnormality of a pressure detecting system referred to hereinafter, etc., and for storing the calculation results outputted from the CPU, and an output circuit for outputting driving signals, etc. The CPU calculates the fuel injection period $T_{OUT}$ for which the fuel injection valves 12 should be opened, in accordance with the determined operating conditions and in sychronism with generation of pulses of the TDC signal, by the use of the following equation (1):

$$T_{OUT} = T_i \times K_1 + K_2 \qquad (1)$$

where $T_i$ represents a basic value of the valve opening period for the fuel injection valves 12, and is calculated from a $T_i$ map, not shown, stored in the memory means in accordance with the absolute pressure $P_{BA}$ and the engine rotational speed Ne, for example. $T_i$ is set in all the operating conditions such that the air-fuel ratio of an air-fuel mixture supplied to the engine is controlled to a stoichiometric value (14.7).

$K_1$ represents correction coefficients depending on engine operating conditions which are calculated based on the intake air temperature $T_A$, the engine coolant temperature $T_{WE2}$, the throttle valve opening $\theta$th, etc., and $K_2$ represents correction constants, for example, for increasing the amount of fuel to be supplied to the engine at acceleration.

The ECU 9 also suppies driving signals to the control valves 75, 77 based on input signals from sensors to drive the control valves 75, 77 and hence also the actuator 71 linked to the turbocharger 71, whereby the capacity of the turbocharger 4 is controlled to an optimum value.

More specifically, the supercharging pressure produced by the turbocharger 4 is controlled in a feedback manner by setting in advance desired supercharging pressure values for respective operating conditions of the engine 1, comparing an actual supercharging pressure value $P_2$ (a value detected by the $P_2$ sensor 100) with a corresponding desired supercharging pressure value, and changing the actual supercharging pressure by varying the opening degree of the movable vanes 63 so that the difference between the actual and desired supercharging pressure values may be made zero. Thus, the supercharging pressure is accurately controlled to desired values in all the operating conditions of the engine 1.

The ECU 15, which operates when the engine 1 is in operation or over a predetermined period of time after the engine 1 has ceased to operate, decides the operation or stoppage of the water pump 20, the operation or stoppage, direction of rotation, and speed of the radiator fan 27, and the operation or stoppage of the bonnet fan 28, based on input signals from the $T_{WE1}$ sensor 14, the $T_{OIL}$ sensor 16, and the $T_{WT}$ sensor 24, and supplies driving signals resulting from the above decisions to the water pump 20, and the first and second motors 29, 30.

The ECCU 15 is electrically connected to the ECU 9. When the engine 1 is in operation, the ECU 9 executes control of the operation and stoppage of the bonnet fan 28 by way of the ECCU 15, and carries out a fail-safe operation for the bonnet fan 28 when the ECCU 5 detects abnormality thereof.

Figure 5:
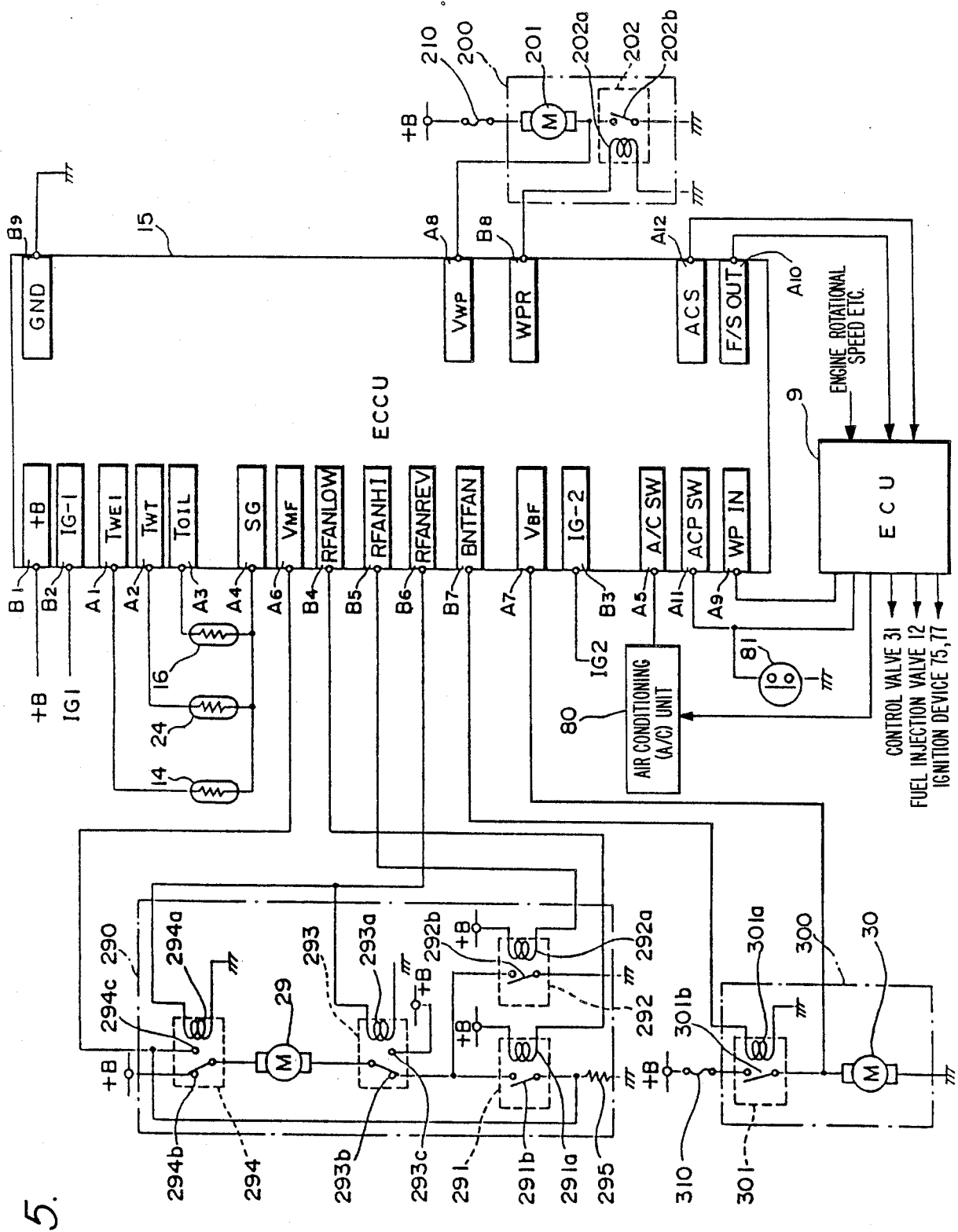
FIG. 5 is a wiring diagram showing the external connections of an electronic cooling control unit appearing in FIG. 1.

FIG. 5 is a wiring diagram showing the external connections of the ECCU 15 in detail. The ECCU 15 has terminals B1 to B9, and A1 to A12. The terminal B1 is connected to a battery, to be supplied with an operating voltage therefrom. The terminal B9 is grounded to the body of the vehicle.

The terminal $B_2$ is connected to an ordinary ON-OFF terminal of the ignition switch 25, whereas the terminal $B_3$ is connected to the battery even when the ignition switch is OFF. If the ignition switch 25 is turned off or opened when the engine is in operation, the engine 1 ceases to operate, and the ECU 5 also becomes inoperative (except for the function of its memory preserving its stored data) by the turning-off of the ignition switch 25. In contrast, the ECCU 15 can operate, if desired, over a predetermined period of time even after the engine 1 has ceased to operate, since it is provided with the terminal $B_2$ which is connected to the battery even after the ignition switch 25 s turned off. The predetermined period of time after stoppage of operation of the engine 1 is set by a timer which is started when the ignition switch 25 is turned off.

During the predetermined period of time set by the timer, at least one of the radiator fan 27, the bonnet fan 28, and the water pump 20 is electrically driven in the state where the engine is not in operation, hence in the state where charging of the battery is not carried out by a generator installed on the vehicle. Therefore, the predetermined period of time is set to such a value as to minimize the consumption of electricity charged in the battery and at the same time enhance the cooling performance while taking into consideration the size of the engine room and the layout of engine parts accommodated therein. For example, the predetermined period of time over which the ECCU is allowed to operate is set to 15 minutes. However, in another example, the predetermined period of time may be set to a longer time period than 20 minutes.

The terminals $A_1$ to $A_3$ are for inputting into the ECCU 15 signals from the $T_{WE1}$ sensor 14, the $T_{WT}$ sensor 24, and the $T_{OIL}$ sensor 16, respectively. The terminal $A_4$ is for grounding the signal system of the internal circuit of the ECCU 15. The terminal $A_5$ is connected to an air conditioning (A/C) unit 80, and an ON-OFF signal from the switch of the air conditioning unit 80 is inputted to the ECCU 15 therethrough.

The terminals $B_4$ to $B_6$ are for controlling the radiator fan 27 and are connected to a driving circuit 290. The driving circuit 290 has first and second relay circuits 291, 292 for selecting low-speed forward rotation and high-speed forward rotation of the radiator fan 27, which respectively comprise coils 291a, 292a and normally-open contacts 291b, 292b, third and fourth relay circuits 293, 294 for selecting forward rotation and reverse rotation of the radiator fan 27, which respectively comprise coils 293a, 294a, normally-closed terminals 293b, 294b, and normally open terminals 293c, 294c, and a resistance 295. The terminal $B_4$ for passing instructions for low speed rotation of the radiator fan 27 is connected to the first relay circuit 291, the terminal $B_5$ for passing instructions for high speed rotation of the radiator fan 27 is connected to the second relay circuit 292, the terminal $B_6$ for passing instructions for reverse rotation is connected to the third and fourth relay circuits 293, 294.

High speed, low speed, forward, and reverse rotations of the radiator fan 27 are carried out in the following manner.

To select low-speed forward rotation of the radiator fan 27, a low-level signal is supplied through the terminal $B_4$ to the first relay circuit 291 to cause same to operate, whereby driving current which is decreased by the resistance 295 flows to the first motor 29 to thereby cause low-speed rotation of the radiator fan 27. To select high-speed forward rotation of the radiator fan 27, a low-level signal is supplied through the termnial $B_5$ to the second relay circuit 292, whereby large driving current flows to the motor 29 to thereby cause high speed rotation of the radiator fan 27.

To select reverse rotation of the radiator fan 27, a high-level signal is supplied through the terminal $B_6$ to the third and fourth relay circuits 293, 294 to cause the respective relay contacts to be connected to the normally open terminals 293c, 294c, whereby the polarity of voltage applied to the motor 29 is inverted and at the same time driving current is decreased by the resistance 295 to thereby cause low-speed reverse rotation of the radiator fan 27.

The reverse rotation of the radiator fan 27 is carried out continuously or intermittently over the predetermined period of time after stoppage of the engine 1. In this state, as shown by the arrows in FIG. 2, air in the engine room 26 is discharged therefrom to the outside in front of the vehicle.

The terminal $B_7$ is for controlling the bonnet fan 28, and is connected to a relay circuit 301 which is part of a driving circuit 300 and comprises a coil 301a, and normally-open contacts 301b. A fuse 310 for exclusive use is also provided in the driving circuit 300. The operation of the bonnet fan 28 is different from that of the radiator fan 27 in that it is merely driven or stopped by the second motor 30. The bonnet fan 28 is operated when a high-level signal is supplied to the terminal $B_7$, and stopped when a low-level signal is supplied thereto.

The operation of the bonnet fan 28 is continuously or intermittently carried out over the predetermined period of time after the stoppage of the engine 1.

The terminal $B_8$ is for controlling the water pump 20, and is connected to a driving circuit 200 having a third motor 201 for driving the water pump 20, and a relay circuit 202 comprising a coil 202a and normally-open contacts 202b. The driving circuit 200 also has a fuse 210 for exclusive use. Similarly to the operation of the bonnet fan 28, the water pump 20 is also merely driven or stopped by the third motor 201. The water pump is operated when a high-level signal is supplied to the terminal $B_8$ and stopped when a low-level signal is supplied thereto.

The operation of the water pump 20 is carried out continuously, or intermittently in place of the bonnet fan 28, during operation of the engine 1 or over the predetermined period of time after stoppage of the engine 1.

The terminals $A_6$ to $A_8$ serve as ports for monitoring terminal voltages $V_{MF}$, $V_{BF}$, and $V_{WP}$ of the respective first to third motors 29, 30, 201 for the radiator fan 27, the bonnet fan 28, and the water pump 20. The ECCU 15 stores in advance in the memory means described in detail hereinbelow voltage values corresponding to the upper and lower limit values of the rotational speed of each motor. If a voltage beyond the range defined by the upper and lower limit values is detected at any of the ports (for example, if a motor is short-circuited to cause the voltage at a corresponding port to increase or decrease beyond the predetermined range), it is judged that a motor corresponding thereto is in abnormal state.

The terminals $A_9$ to $A_{12}$ are connected to the ECU 9. The terminal $A_9$ is for inputting a signal supplied from the ECU 9 for controlling the water pump 20. The control signal is obtained based on operating conditions of the engine 1 determined by the engine rotational speed, the engine coolant temperature, the intake air temperature, etc. The terminal $A_{10}$ serves as a fail-safe output terminal, through which a control signal is supplied to the ECU 9, for giving instructions for fail-safe operation when abnormality is detected. The ECU 9 carries out fail-safe operation in response to the control signal.

The terminal $A_{11}$ is connected to an air-conditioning refrigerant pressure switch 81 and supplied with a signal indicative of ON- or OFF-state of the switch 81. The switch 81 is turned on when the refrigerant pressure of a compressor, not shown, of the air-conditioning unit is equal to or higher than a predetermined value. The ON-OFF signal is also supplied to the ECU 9. The terminal $A_{12}$ outputs to the ECU 9 a signal indicating that the air-conditioning unit is in operation.

In the air conditioning unit 80, the compressor is operated or stopped (more specifically, the compressor is connected to or disconnected from the driving shaft of the engine) in response to a driving signal from the ECU 9.

The aforesaid switch 81 and terminal $A_{11}$ are used for controlling the operation of the radiator fan in the following manner.

If the engine coolant temperature $T_{WE1}$ exceeds a predetermined high temperature value (e.g. 90° C.), it is necessary to supply a low-level voltage signal to the terminal $B_5$ so as to cause high-speed forward rotation of the radiator fan to thereby air-cool the engine 1. However, even if the engine coolant temperature $T_{WE1}$ is slightly lower than the predetermined high temperature (e.g. higher than 84° C.), depending on the operation of the air conditioning unit and the pressure of the refrigerant, it may be sometimes desirable to cause rotation of the radiator fan 27, and to switch between high speed rotation and low speed rotation thereof. Particularly, if the radiator fan 27 and the condenser fan of the air conditioning unit are interconnected to operate together, degradation of the performance of the air conditioning unit can be prevented by cooling the refrigerant through rotating the radiator fan 27 even before the engine coolant temperature $T_{WE1}$ exceeds the predetermined high temperature. Further, in this case, if the intensity of blowing, i.e. the speed of rotation of the radiator fan 27, is increased or decreased depending on whether or not the pressure of the refrigerant is higher than a predetermined value (e.g. 10 kg/cm$^2$), it is possible to control air conditioning more properly.

Therefore, when the engine coolant temperaure $T_{WE1}$ does not exceed the predetermined high temperature value, the radiator fan 27 is controlled in the following manner. If the pressure of refrigerant of the air conditioning unit is high, i.e. if the aforesaid switch 81 is ON, the radiator fan 27 is controlled in advance to high speed rotation, whereas if not, i.e. if the switch 81 is OFF, the radiator fan 27 is controlled to low speed rotation.

The air-conditioning refrigerant pressure switch 81 and the terminal $A_{11}$ are provided for collecting information necessary for the above-described control of the radiator fan 27. The program for this control may be stored in advance in the memory means of the ECCU 15.

The ECCU 15 comprises an input circuit which is supplied with various input signals, carries out waveform-shaping of some of the input signals, shifts the voltage level of input signals to a predetermined level, converts analog signals of the input signals to digital signals, etc., a central processing unit (CPU), memory means storing programs to be executed in the CPU and for storing the calculation results outputted from the CPU, and an output circuit for outputting signals to the terminals $B_4$ to $B_8$, $A_{10}$, and $A_{12}$. Further, if the water pump 20 is intermittently operated as described hereinbefore, the ECCU 15 may also include a timer for controlling the operation of the water pump 20.

Figure 6:
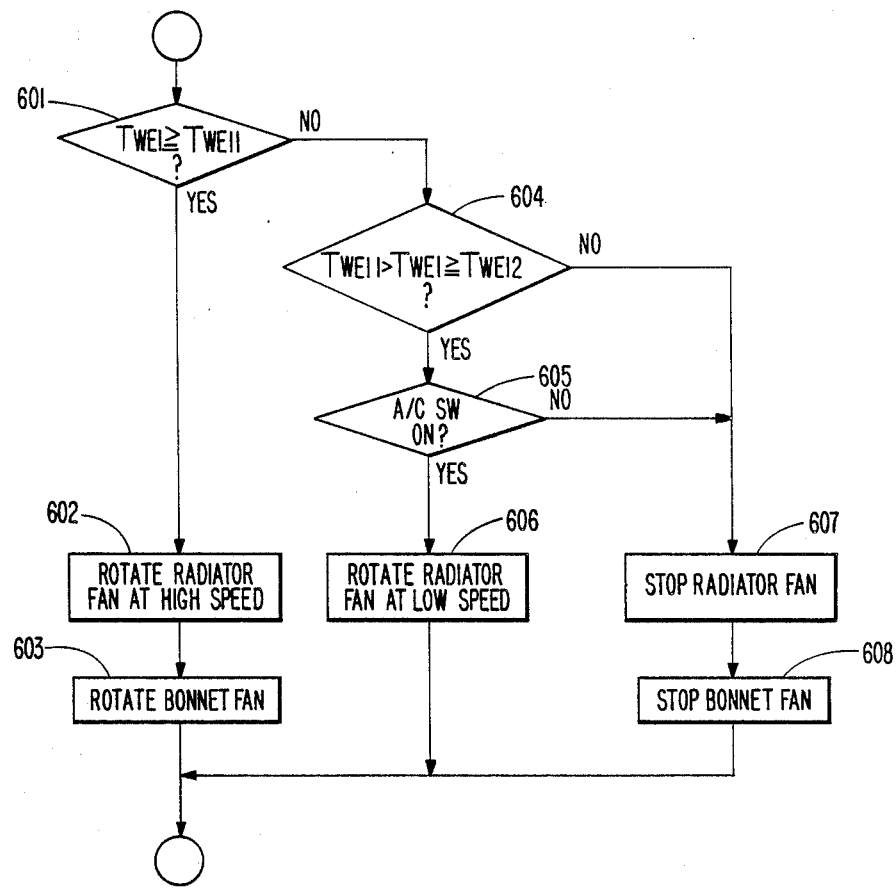
FIG. 6 is a flowchart showing a subroutine for controlling the operation of fans during operation of the engine.

FIG. 6 shows a subroutine carried out by the ECCU 15 for controlling the operation or stoppage of the radiator fan 27, the selection of the speed of rotation thereof, and the operation or stoppage of the bonnet fan 28. This program is executed out when the ignition switch is ON, i.e. when the engine 1 is in operation, either in synchronism with generation of the TDC signal pulses or in asynchronism therewith and at predetermined constant intervals of time.

First, at a step 601, it is determined whether or not the engine coolant temperature $T_{WE1}$ is equal to or higher than a first predetermined value $T_{WE11}$ (e.g. 90° C.). If the answer at the step 601 is Yes, the radiator fan 27 is driven for rotation at high speed (step 602), and the bonnet fan 28 is also driven for rotation (step 603), followed by terminating the present program. Thus, if the engine coolant temperature $T_{WE1}$ is high, not only the radiator fan 27 but also the bonnet fan 28 is driven to air-cool the engine 1 and the engine room 26.

If the answer at the step 601 is No, i.e. if the $T_{WE1}$ is lower than the first predetermined value $T_{WE11}$, it is determined at a step 604 whether or not the engine coolant temperature $T_{WE1}$ is within the range between the first predetermined value $T_{WE11}$ and a second predetermined value $T_{WE12}$ (e.g. 84° C.) slightly lower than the first predetermined value $T_{WE11} > T_{WE1} \geq T_{WE12}$, it is determined at a step 605 whether or not the air conditioning (A/C) switch is ON. If the answer at the step 605 is Yes, the operation of the radiator fan 27 is switched to low speed rotation thereof (step 606), followed by terminating the present program.

As described above, the radiator fan 27 is driven at low speed even if the engine coolant temperature $T_{WE1}$ is lower than the first predetermined value $T_{WE11}$ on condition that the switch of the air conditioning unit is ON. This is because in this embodiment the radiator fan 27 is interconnected with the condenser fan of the air conditioning unit 70 to simultaneously be driven together. More specifically, even before the $T_{WE1}$ does not reach the first predetermined value $T_{WE11}$, the refrigerant of the air conditioning unit is cooled to thereby prevent degradation of the performance thereof. If the engine coolant temperature TWE1 is equal to or higher than the first predetermined value $T_{WE11}$, the radiator fan 27 is driven for high speed rotation irrespective of the operation of the air conditioning unit.

In the meanwhile, if the answer at the step 604 is No, i.e. if the engine coolant temperature $T_{WE1}$ is lower than the second predetermined value $T_{WE12}$, or if the answer at the step 605 is No, i.e. if the air conditioning unit is not in operation while $T_{WE11} > T_{WE1} \geq T_{WE12}$, the radiator fan 27 and the bonnet fan 28 are both stopped (steps 607, 608), followed by terminating the present program.

Thus, while the engine 1 is in operation, air-cooling of the engine room 26 can be carried out by the radiator fan 27 and the bonnet fan 28. This also contributes to prevention of excessive rise in the engine room temperature and hence percolation of fuel after the engine has been stopped, and further to effective cooling of the turbocharger.

FIG. 7 shows a subroutine for controlling the operation of the radiator fan 27 and the bonnet fan 28 when the ignition switch is OFF, i.e. when the engine is not in operation. This program is executed at predetermined constant time intervals.

First, at a step 701, it is determined whether or not the ignition switch 25 is ON. If the answer at the step 701 is Yes, i.e. if the engine is in operation, a flag FLG is set to a value of 0 (step 702), followed by terminating the present program.

If the answer at the step 701 is No, i.e. if the engine 1 is not in operation, it is determined at a step 703 whether or not the flag FLG has been set to a value of 1. If the answer at the step 703 is No, i.e. if the flag FLG has been set to 0, and therefore the present loop is the first loop after the engine 1 has been stopped, it is determined at a step 704 whether or not the engine lubricating oil temperature $T_{OIL}$ is lower than a predetermined $T_{OIL}$ value $T_{OILRB}$ (e.g. 105° C.) to decide whether or not both the radiator fan 27 and the bonnet fan 28 should be operated. In this embodiment, a signal indicative of a $T_{OIL}$ value is outputted from the $T_{OIL}$ sensor, which is arranged, as shown in FIG. 1, in the head cover of the engine 1 for detecting the temperature of lubricating oil in the head cover.

The lubricating oil temperature $T_{OIL}$ is used as a parameter for controlling the operation of the radiator fan 27 and that of the bonnet fan 28 after the engine has been stopped for the following reason:

The lubricating oil temperature is one of the temperatures representative of the temperature of the main body of the engine. Since the lubricating oil is less susceptible to external factors, such as air stream produced by running of the vehicle and the driving method of the radiator fan 27, than engine cooling water (engine coolant), it can represent the load on the engine 1 more accurately.

However, engine cooling water is cooled to a larger degree as air stream produced by running of the vehicle is hit against the engine at a higher rate. Therefore, there can be the phenomenon that the cooling water temperature is lowered whereas load on the engine is increased. In contrast, the lubricating oil temperature hardly depends on such external factors. For example, when the vehicle is cruising at a speed of 60 km/h, the lubricating oil temperature is stable approximately within the range of 100°±5° C., and when the vehicle is cruising at a speed of 100 km/h, the lubricating oil temperature is approximately within the range of 115°±5° C.

Therefore, in controlling the air-cooling of the engine room after stoppage of the engine, the lubricating oil temperature $T_{OIL}$ is used which is less susceptible to the external factors, and hence is capable of preventing inconvenience due to the external factors (for example, if the cooling water temperature is used, when the engine has been operating under a heavily-loaded condition, and therefore air-cooling of the engine room should be carried out, the water temperature can be low, though in rare cases, and adversely affect the control of air-cooling of the engine room). Thus, the lubricating oil temperature more accurately represents the engine load condition before stoppage of the engine.

If the answer at the step 704 is Yes, i.e. when the $T_{OIL}$ has not reached the predetermined $T_{OIL}$ value $T_{OILRB}$, the driving circuit 290 for the radiator fan 27 is deenergized to control the radiator fan 27 to stoppage (step 705), and similarly the driving circuit 300 for the bonnet fan is deenergized to control the bonnet fan 28 to stoppage (step 706), followed by terminating the present program.

As described above, the mere satisfaction of the condition of stoppage of the engine does not lead to the start of the radiator fan 27 and the bonnet fan 28.

If the answer at the step 704 is No, i.e. if $T_{OIL} \geq T_{OILRB}$, a $t_{RB}$ timer (e.g. a timer comprising a down counter) for counting a predetermined period of time $t_{RB}$ (e.g. 12 minutes) stored in the ECCU 15 is started (step 707), the flag FLG is set to a value of 1 (step 708), and then both of the radiator fan 27 and the bonnet fan 28 are controlled to operation (steps 709, 710), followed by terminating the present program.

Thus, both of the fans 27, 28 are driven, when the stoppage of the engine 1 is detected and the detected $T_{OIL}$ is equal to or higher than the predetermined $T_{OIL}$ value $T_{OILRB}$.

In this embodiment, rotation of the radiator fan 27 after stoppage of the engine 1 is reverse, and low in speed. The reason for this is as follows:

When the engine 1 is not in operation, if the radiator fan 27 is driven for forward rotation while the bonnet fan 28 is also driven to supply air into the engine room 26 from the outside as shown in FIG. 2, there is the possibility that air flows produced by the two fans 27, 28 collide with each other within the engine room 26 only to cause high temperature air to circulate therein, depending on the layout of engine parts therein etc., which leads to spoiling the advantage of the cooperative operation of the two fans 27, 28.

Therefore, in this embodiment, the radiator fan 27 is reversely rotated so as to actively form air streams from the inside of the engine room 26 to the outside of the front of the vehicle. This makes it possible to cause low-temperature cooling air drawn into the engine room 26 from the outside through the bonnet fan 28 to flow therethrough to cool the engine room 26 in the minimum required time period. The rotation of the radiator fan 27 is carried out at low speed because it suffices to actively form cooling air streams for cooling the engine room 26 when the engine is not in operation.

Figure 8:
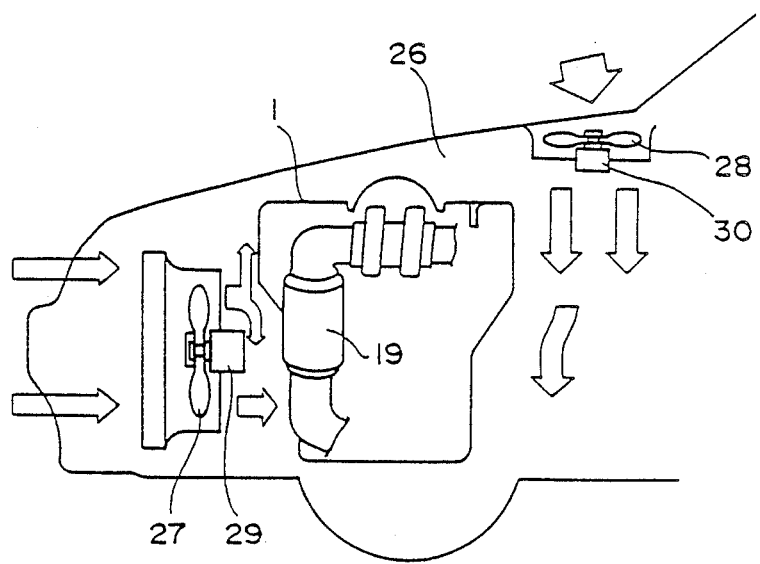
FIG. 8 is schematic diagram showing air streams produced by forward rotation of the fans.

The above-described control of the radiator fan 27 is advantageous particularly when the three-way catalyst 19 arranged between the radiator fan 27 and the main body of the engine 1 or in the vicinity of the engine main body. More specifically, in the engine room 26 according to this embodiment, as shown in FIG. 2, the three-way catalyst 19 is located just at the rear of the radiator fan 27 in order to improve exhaust emission characteristics (to enhance the activation of the catalyst). Since the three-way catalyst forms a heat source in the engine room 26, if the radiator fan 27 is rotated forward as shown in FIG. 8, air streams produced thereby strike the three-way catalyst 19 so that the resulting high tempeature air streams merely stir the air inside the engine room 26, and proper cooling of the engine room 26 cannot be expected. However, according to this embodiment of the invention, hot air in the engine room 26 is positively exhausted to the outside thereof, and therefore air-cooling thereof can be very effectively carried out irrespective of existence of heat sources, such as the three-way catalyst and the turbocharger, and the arrangement thereof.

Returning to FIG. 7, the above-described reverse low speed rotation of the radiator fan 27 and the rotation of the bonnet fan 28 are continued over a predetermined time period during which the timer $t_{RB}$ is in operation.

More specifically, in the following loops, the answer at the step 703 is Yes, and the program proceeds to a step 711, where it is determined whether or not the predetermined time period has passed after the start of the timer $t_{RB}$. If the answer at the step 711 is No, the steps 709, 710 are carried out to cause the operation of the fans 27, 28 to be continued, whereas if the answer at the step 711 is Yes, the steps 705, 706 are carried out to cause the operation of the fans 27, 28 to be stopped, followed by terminating the present program.

As described above, according to the engine room air-cooling control of the invention, it is possible to carry out synthetic air-cooling of the engine room 26 during operation of the engine and after stoppage thereof by the cooperative operation of the radiator fan 27 and the bonnet fan 28. In particular, since the control is based on the lubricating oil temperature $T_{OIL}$, the air-cooling control can be carried out accurately to just a sufficient degree depending on the load on the engine just before the stoppage thereof and only in a temperature range requiring cooling, without being influenced by external factors such as air streams produced by running of the vehicle just before stoppage of the engine, whereby thermal damage can be properly prevented. Further, the operation of the fans can be limited to the minimum required extent, so that electricity stored in the battery is not excessively wasted and degradation of the durability of the motors for driving the fans can be prevented.

Figure 7A:
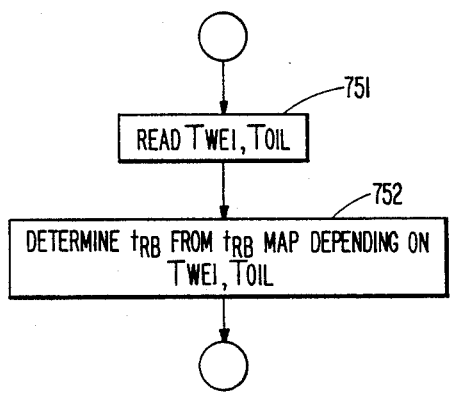
FIG. 7A is a flowchart showing a subroutine for setting a time period over which are operated the fans as a variation of FIG. 7.
Figure 7B:
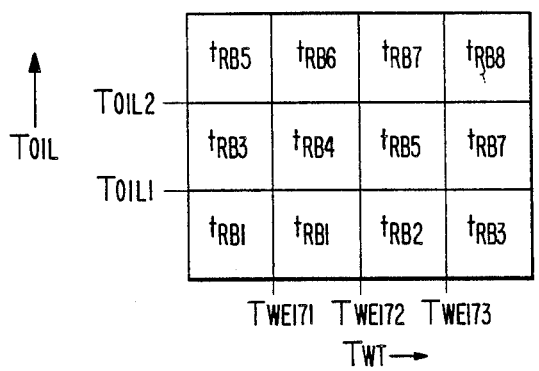
FIG. 7B is a $t_{RB}$ map used in the subroutine of FIG. 7A.

FIG. 7A and 7B show a variation of the above-described embodiment of the invention. FIG. 7A shows steps corresponding to the steps 704 and 707 of FIG. 7. At a step 751 of FIG. 7, the engine coolant temperature $T_{WE1}$ and the lubricating oil temperature $T_{OIL}$ are read, and in accordance with the read temperature values, at a step 752, a time period $t_{RB}$ is selected from a map of time period values $t_{RB1}$ to $t_{RB8}$ (which are set e.g. to 0, 3, 5, 6, 8, 9, 10, and 12 minutes, respectively) corresponding, respectively, to a plurality of regions divided by predetermined values of the parameters, i.e. $T_{WE171}$, $T_{W172}$, and $T_{W173}$ (e.g. 90° C., 95° C., and 100° C., respectively), and $T_{OIL1}$, and $T_{OIL2}$ (e.g. 100° C., and 105° C., respectively) as shown in FIG. 7B. By thus deciding the time period over which the fans 27, 28 are to be operated by the use of both the engine coolant temperature reflecting external factors, such as air stream produced by running of the vehicle, and the lubricating oil temperature reflecting the engine load, the fans 27, 28 can be operated over an optimum time period reflecting both the external factors and the engine load, to thereby enable carrying out accurate and effective control of air-cooling of the engine room.

Figure 9:
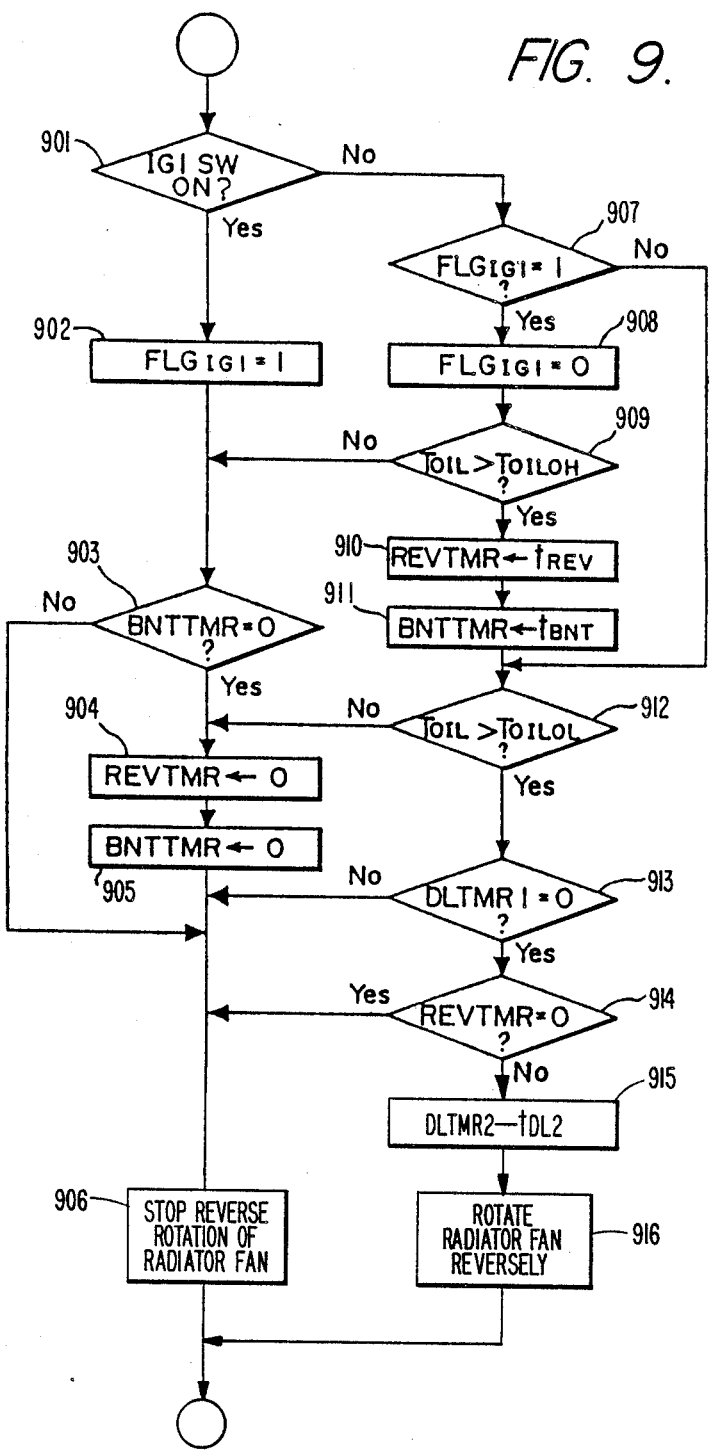
FIG. 9 is a flowchart showing a subroutine for controlling the operation of a radiator fan according to a second embodiment of the invention.
Figure 10:
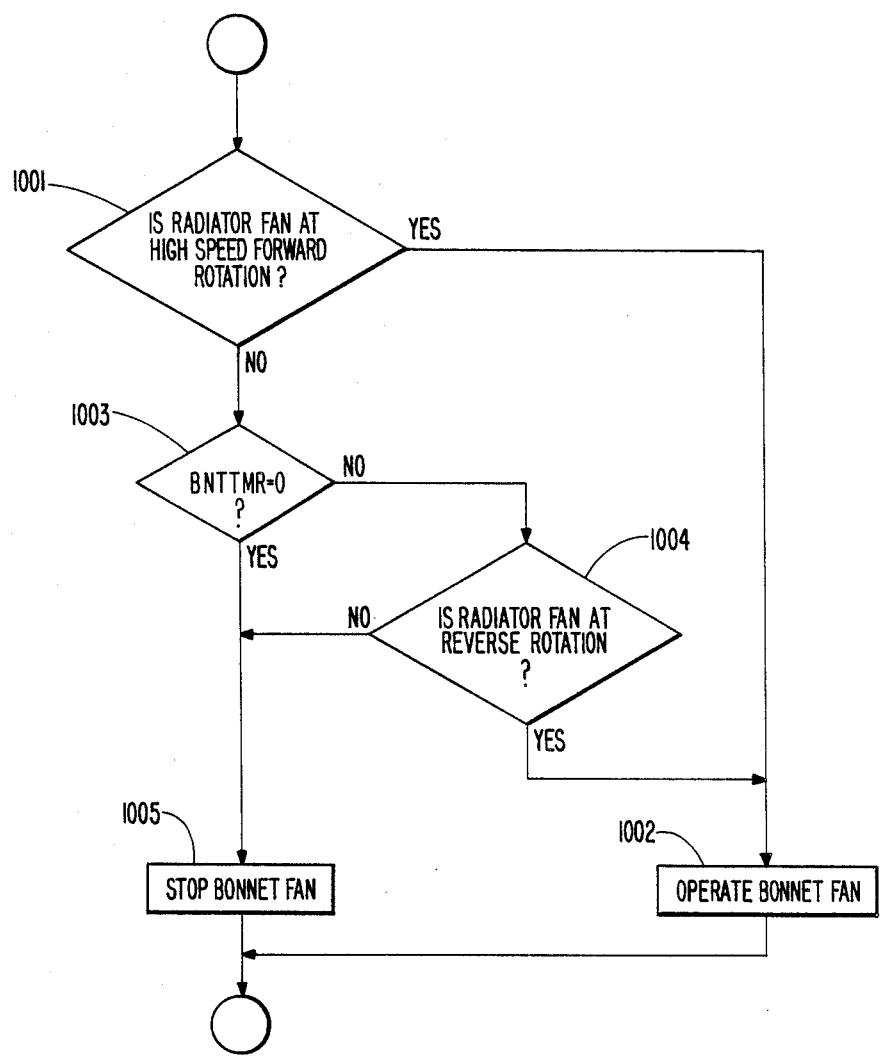
FIG. 10 is a flowchart showing a subroutine for controlling the operation of a bonnet fan according to a second embodiment of the invention.

FIGS. 9 and 10 show another embodiment of the invention.

The embodiment of the invention described above with reference to the program shown in FIG. 7 still has room for further improvement.

Figure 12:
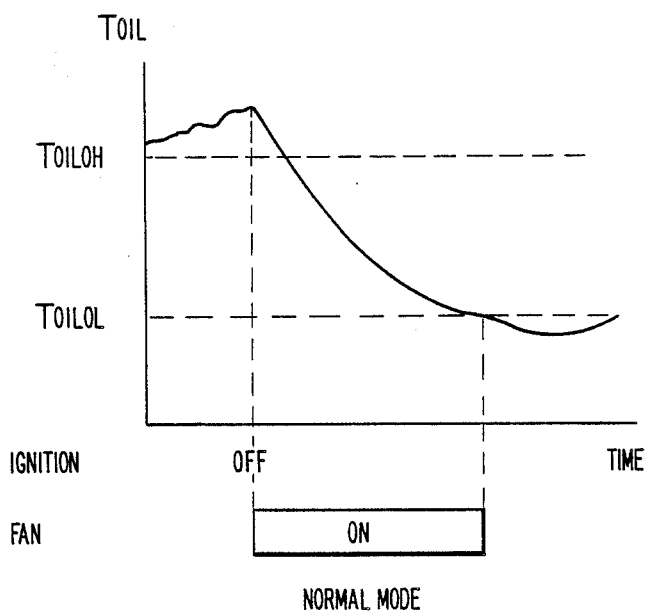
FIG. 12 is a timing chart useful for explaining a normal mode of operation of a cooling fan.
Figure 13:
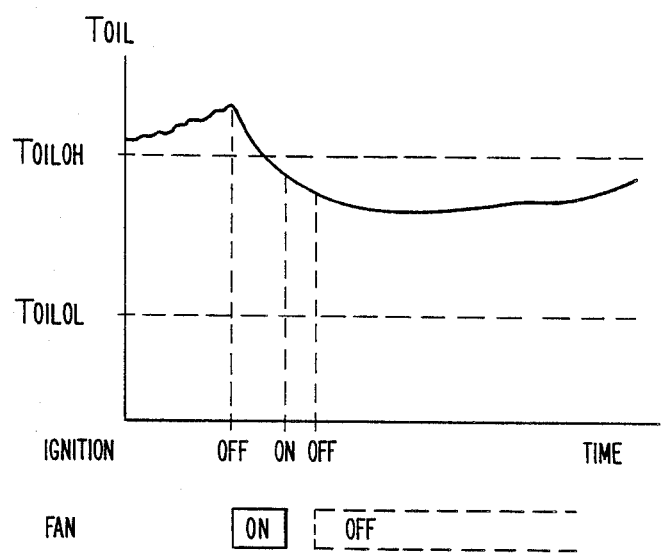
FIG. 13 is a timing chart useful for explaining a case in which the cooling fan does not operate.

Specifically, as shown in FIG. 12, if the lubricating oil temperature of the engine assumed when the ignition switch has been turned off exceeds a higher discriminating value (which corresponds to the predetermined $T_{OIL}$ value $T_{OILRB}$ in the first embodiment), a timer is started to count a predetermined period of time to cause a fan to rotate so as to air-cool the engine room over the predetermined period of time. During this control of air-cooling the engine room, there may be a case in which the engine is started again before the predetermined period of time elapses, as shown in FIG. 13. For example, suppose that the vehicle is stopped and the ignition switch is turned off at a gas station for refilling the vehicle with fuel, and immediately after the refilling the vehicle is started to move and stopped for washing the vehicle. If the lubricating oil temperature is slightly lower than the higher discriminating value when the ignition switch is turned off for the second time, fan is not rotated in spite of the fact that the engine room temperature has not been lowered sufficiently, since the condition for starting the engine room air-cooling control after stoppage of the engine is not satisfied. Therefore, it is impossible to carry out air-cooling of the engine room properly and efficiently in such a case.

Figure 11:
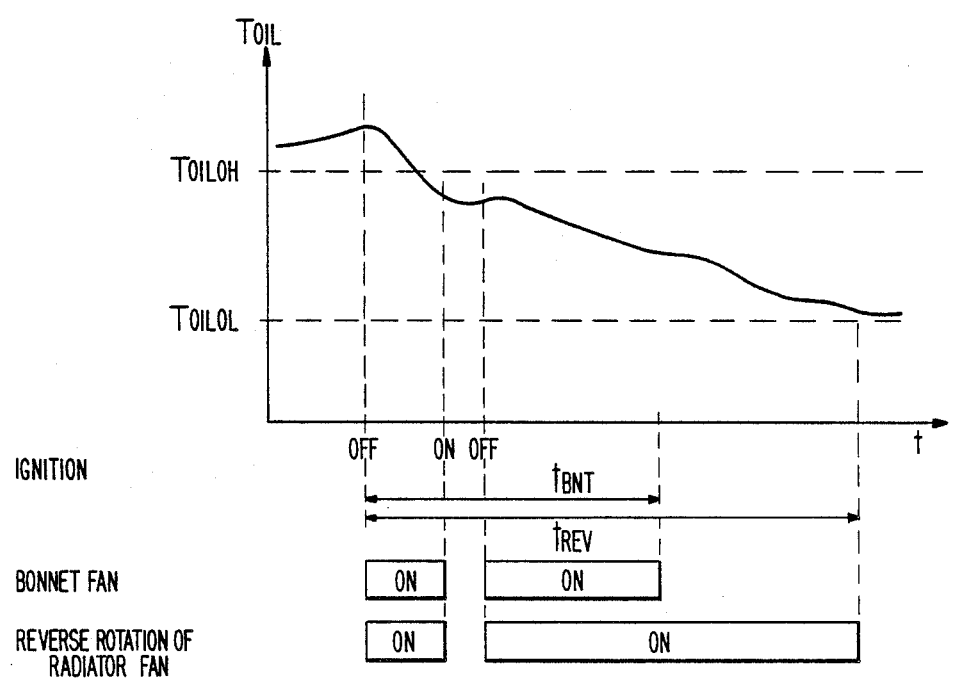
FIG. 11 is a timing chart useful for explaining the manner of engine room-cooling control to which the programs of FIGS. 9 and 10 are applied.

The embodiment described hereinafter with reference to FIGS. 9 to 11 is adapted to carry out air-cooling of the engine room properly and efficiently in such a case as described above.

FIG. 9 shows a subroutine for controlling the air-cooling of the engine room after stoppage of the engine by driving the radiator fan. The present program is carried out in the ECCU 15 at predetermined constant time intervals.

First, at a step 901, it is determined whether or not the ignition switch 25 is ON. If the answer at the step 901 is Yes, an ignition ON flag $FLG_{IG1}$ is set to a value of 1 at a step 902, and then it is determined at a step 903 whether or not a bonnet fan-operating timer BNTTMR (e.g. a down counter) indicates a value of 0.

If the answer at the step 903 is Yes, a timer REVTMR for controlling reverse rotation of the radiator fan 27 is set to a value of 0 at a step 904, and then the timer BNTMR is set to a value of 0 again at a step 905. Next, the reverse rotation of the radiator fan 27 is stopped at a step 906, followed by terminating the present program. In the meanwhile, if the answer at the step 903 is No, the program skips over the above steps 904, 905 to the step 906, followed by terminating the present program.

If the answer at the step 901 is No, it is determined at a step 907 whether or not the flag $FLG_{IG1}$ has been set to a value of 1. If the answer at the step 907 is Yes, i.e. if the present loop is the first loop after stoppage of the engine 1, the flag $FLG_{IG1}$ is set to a value of 0 at a step 908, and then it is determined at a step 909 whether or not the engine lubricating oil temperature $T_{OIL}$ is higher than a predetermined value $T_{OILOH}$ (e.g. 94° C.).

If the answer at the step 909 is No, it is judged that reverse rotation of the radiator fan 27 is not needed, and the program proceeds to the step 903 et seq. If the answer at the step 909 is Yes, it is judged that reverse rotation of the radiator fan 27 is needed, and the program proceeds to the step 910.

At the step 910, the radiator fan-operating timer REVTMR is set to a predetermined operating time period $t_{REV}$ (e.g. 20 minutes), and then at a step 911 the bonnet fan-operating timer BNTTMR is set to a predetermined operating time period $t_{BNT}$ (e.g. 12 minutes). The operating time periods for the radiator fan 27 and the bonnet fan 28 have different values from each other as described above, the former being longer than the latter ($t_{REV} > t_{BNT}$).

Next, it is determined at a step 912 whether or not the lubricating oil temperature $T_{OIL}$ is higher than a predetermined value $T_{OILOL}$ (e.g. 65° C.) for turning off the radiator fan 27. The predetermined values $T_{OILOH}$ and $T_{OILOL}$ are set in a manner as shown in FIG. 11.

If the answer at the step 912 is Yes, it is determined at a step 913 whether or not a delay timer DLTMR1 indicates a value of 0. The delay time DLTMR1 is provided for waiting for a predetermined time period to elapse before the reverse rotation of the radiator fan 27 starts. If the answer at the step 913 is No, the program proceeds to the step 906. If the answer at the step 913 is Yes, the program proceeds to a step 914, where it is determined whether or not the predetermined operating time period tREV set at the 910 has elapsed.

If the answer at the step 914 is No, the program proceeds to a step 915, where a delay timer DLTMR2 for delaying the start of forward rotation of the radiator fan 27 is set to a predetermined time period $t_{DL2}$ (e.g. 7.5 seconds). Then, at a step 916, the radiator fan 27 is turned on for reverse rotation, followed by terminating the present program.

After the reverse rotation of the radiator fan 27 is thus started, in the following loops, if the state of the ignition switch being OFF is continued, the steps 908 to 911 are skipped over, whereby the reverse rotation of the radiator fan 27 is continued while the $T_{OIL}$ value is above the $T_{OILOL}$ or until the timer REVTMR counts up (normal mode shown in FIG. 12).

In the above process, the reverse rotation of the radiator fan is stopped if the timer REVTMR counts up the predetermined time period $t_{REV}$, i.e. if the answer at the step 914 is Yes, or if the lubricating oil temperature $T_{OIL}$ becomes equal to or lower than the predetermined value $T_{OILO}$ (i.e. if the answer at the step 912 is No) even before the predetermined time period $t_{REV}$ elapses. In the latter case, both the timers REVTMR and BNTTMR are reset and the radiator fan 27 is turned off (step 906).

In the meanwhile, in the case where the ignition switch 25 is once turned off, and then as shown in FIG. 11, the switch 25 is turned on and then soon turned off again and at the second turning-off the $T_{OIL}$ is lower than the predetermine value $T_{OILOH}$, the engine room air-cooling control is carried out in the following manner to air-cool the engine room efficiently.

Specifically, if the ignition switch is turned on before the predetermined operating time period $t_{BNT}$ elapses, the program in FIG. 9 proceeds from the step 901 to the steps 902 and 903. However, since the timer BNTTMR is then in operation (FIG. 11), the steps 904 and 905 are skipped over, and then the radiator fan 27 is once turned off (step 906). Thus, once the timer BNTTMR has been set (the timer REVTMR has also been set at the same time), it is not cleared even if the ignition switch 25 is turned on before the timer BNTTMR counts up.

If the ignition switch is turned off again shortly after being furned on, the program proceeds from the step 901 to the steps 907 to 909. In this first loop after the ignition switch is turned off for the second time, the flag FLG$_{IG1}$ is reset to 0 at the step 908, and since at this time $T_{OIL} \leq T_{OILOH}$ (FIG. 11), the steps 903 et seq are carried out. In the following loops, the program jumps from the step 907 to the step 912 to cause the radiator fan 27 to be rotated reversely (FIG. 11). Therefore, the engine room can be efficiently air-cooled and rise in the engine room temperature as shown in FIG. 13 can be prevented.

FIG. 10 shows a subroutine for controlling the operation of the bonnet fan 28.

At a step 1001, it is determined whether or not the radiator fan 27 is rotating forward at high speed. If the answer at the step 1001 is Yes, the bonnet fan is turned on (step 1002), followed by terminating the present program. If the answer at the step 1001 is No, it is determined at a step 1003 whether or not the timer BNTTMR set at the step 911 in FIG. 9 has counted up. As described above, the timer BNTTMR is set under the condition that air-cooling of the engine room should be carried out after the ignition switch has been turned off. Therefore, the step 1003 is carried out to determine whether the engine room is not under such a condition.

If the answer at the step 1003 is No, it is judged that the timer BNTTMR has been set, and it is determined at a step 1004 whether or not the radiator fan 27 is rotating reversely. If the answer at the step 1004 is Yes, the step 1002 is carried out to drive the bonnet fan 28 in combination with the radiator fan 27, followed by terminating the present program. As described above, when the ignition switch is turned off, the bonnet fan 28 can be driven for rotation in combination with the operation of the radiator fan 27.

The rotation of the bonnet fan 28 is continued until the reverse rotation of the radiator fan 27 is stopped (the step 906 in FIG. 9, i.e. until the answer at the step 1004 is No), or until the timer BNTTMR has counted up (the answer at the step 1003 is Yes). Thus, even if the ignition switch is turned on and off within a short time while the engine room air-cooling control is carried out as shown in FIG. 11, in combination with the operation of the radiator fan 27, which is started again, the bonnet fan 28 is also started to air-cool the engine room.

Thus, according to this embodiment of the invention, it is possible not only to carry out air-cooling of the engine room 26 properly by the two fans 27, 28 when the engine 1 has stopped, but also to prevent the delay of lowering in temperature as shown in FIG. 13 by continuing air-cooling of the engine room 26 even after the ignition switch has been turned on and off within a short time while the two fans are in operation.

Figure 14:
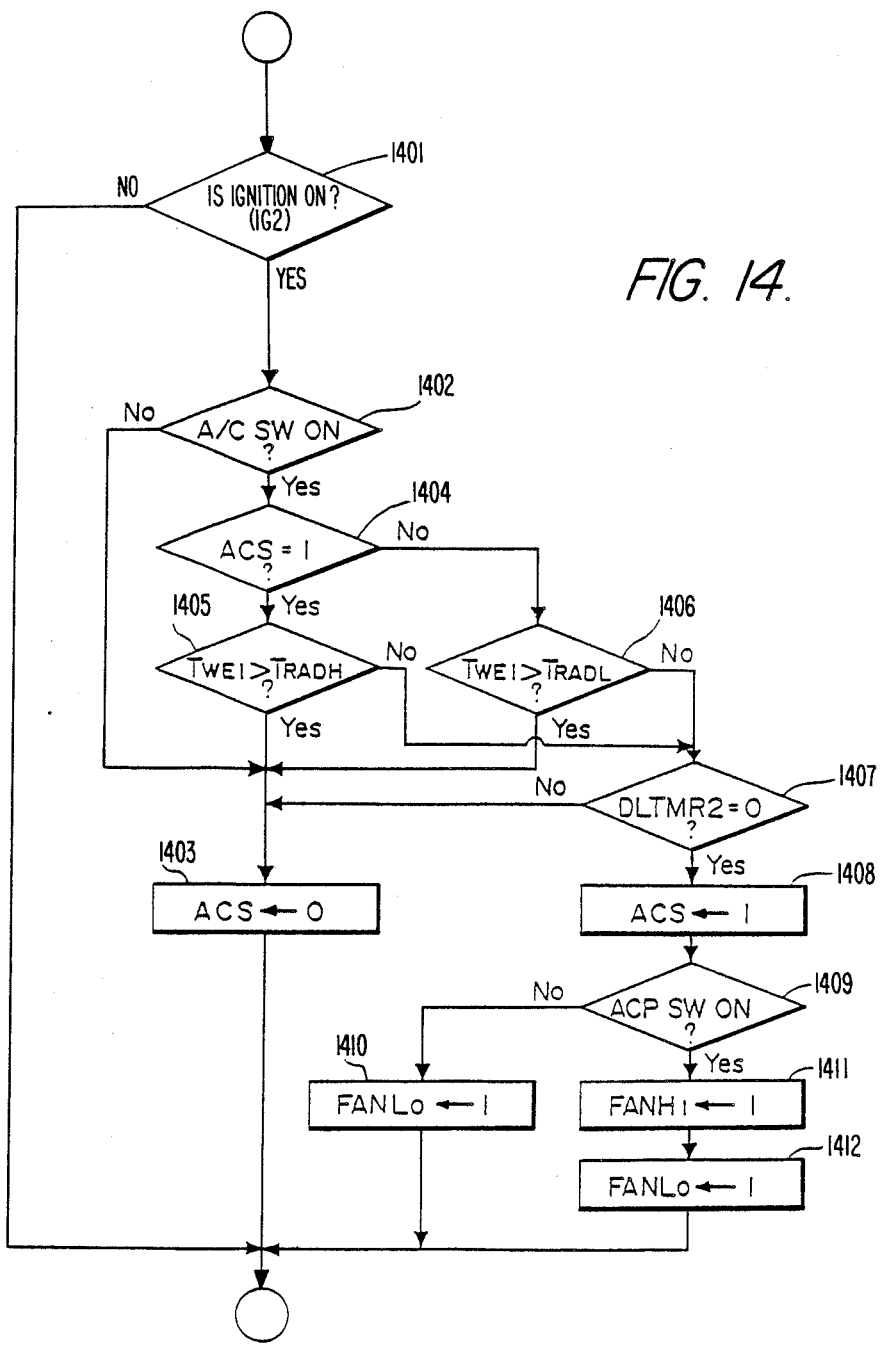
FIG. 14 is a flowchart showing a subroutine for controlling the operation of the radiator fan after restart of the engine according to a third embodiment of the invention.

FIG. 14 shows another embodiment of the invention.

This embodiment is intended to achieve proper control of the rotation of the radiator fan and the refrigerant pressure of the compressor of the air-conditioning unit.

In the above-described embodiments, the radiator fan 27 is used as a reversely-rotatable fan, and the engine room 26 is air-cooled by reverse rotation of the radiator fan 27 after the engine 1 has stopped. The reverse rotation of the radiator fan 27 is effective to exhaust hot air from the engine room, and contributes to prevention of rise in the engine room temperature after stoppage of the engine 1 which has been driven under high load condition.

According to the previous embodiments, when the engine is restarted from the state in which the radiator fan is being reversely rotated, it is necessary to change the direction of rotation of the radiator fan to forward rotation. However, this change undergoes a time lag since the fan continues to reversely rotate by inertia even after a command has been given to the fan to rotate forward. This delay in the change brings about the following problems:

In the engine room air-cooling system, which is constructed such that the radiator fan 27 cooperates with the condenser fan of the air-conditioning unit, if the engine 1 is stopped and started soon again in the state where the temperature in the engine room is still high and at the same time the switch of the air conditioning unit is turned on, air-cooling of the refrigerant of the compressor of the air-conditioning unit cannot be carried out until the radiator fan actually starts forward rotation. In such a case, if the operation of the air-conditioning unit is started simultaneonsly with turning-on of the switch thereof, the pressure of the refrigerant of the compressor is increased, which makes it impossible to carry out proper air-conditioning operation.

The present embodiment aims to solve the above-described problem which is inherent in the engine room air-cooling system which is adapted to cause the radiator fan 27 to rotate reversely after stoppage of the engine 1.

FIG. 14 shows a subroutine for controlling the operation of the radiator fan 27 and that of the compressor of the air-conditioning unit. The radiator fan 27 is controlled in accordance with the program when the engine 1 is restarted while the ECCU 15 is in operation after stoppage of the engine 1. In the meanwhile, the air-conditioning unit 80 is controlled by driving signals from the ECU 9 to operate or stop the compressor thereof.

First, at a step 1401, it is determined whether or not the ignition switch 25 is ON. The determination at the step 1401 is carried out with reference to $IG_2$ supplied to the terminal $B_3$, and during cranking of the engine 1, it is determined that the ignition switch 25 is OFF.

When the answer at the step 1401 is No, the present program is terminated at once. When the answer at the step 1401 is Yes, it is determined at a step 1402 whether or not the switch A/C SW of the air-conditioning unit is ON. If the answer at the step 1402 is No, a signal ACS is set to 0 (step 1403), followed by terminating the present program. In other words, in these cases, a signal indicating that the air-conditioning unit is in operation is not supplied to the ECU 9.

If the answer at the step 1402 is Yes, it is determined at a step 1404 whether or not the signal ACS has a value of 1, i.e. the signal indicating that the air-conditioning unit is in operation is being supplied to the ECU 9. If the answer at the step 1404 is Yes, it is determined at a step 1405 whether or not the engine coolant temperature $T_{WE1}$ is higher than a predetermined value $T_{RADH}$ (e.g. 109° C.). If the answer at the step 1405 is Yes, i.e. if $T_{WE1} > T_{RADH}$, the above step 1403 is carried out, followed by terminating the present program. If the answer at the step 1405 is No, i.e. if $T_{WE1} \leq T_{RADH}$, the program proceeds to a step 1407.

If the answer at the step 1404 is No, it is determined at a step 1406 whether or not the engine coolant temperature $T_{WE1}$ is higher than a predetermined value $T_{RADL}$ (e.g. 107° C.), which is lower than the above predetermined value $T_{RADH}$. If the answer at the step 1406 is Yes, i.e. if $T_{WE1} > T_{RADL}$, the step 1403 is carried out, followed by terminating the present program. If the answer at the step 1406 is No, i.e. if $T_{WE1} \leq T_{RADL}$, the program proceeds to the step 1407 et seq.

The above predetermined values $T_{RADH}$, $T_{RADL}$ are coolant temperature values for determining whether or not the switch ACS of the air conditioner is to be turned on. In determining the ACS operation, a predetermined hysteresis is provided between the high and low sides for prevention of hunting.

At the step 1407, it is determined whether or not the timer DLTMR2 for delaying the start of forward rotation of the radiator fan 27 indicates a value of 0, i.e. whether or not the predetermined time period $t_{DL2}$ has elapsed after the start of the timer DLTMR2. The timer DLTMR2 is started immediately after the radiator fan 27, which has been started after stoppage of the engine 1, ceases to be driven for reverse rotation. The predetermined time period $t_{DL2}$ (e.g. 7.5 seconds) is set to the DLTMR2 by another subroutine, i.e. by the subroutine shown in FIG. 7.

If the answer at the step 1407 is No, i.e. before the predetermined time period $t_{DL2}$ has elapsed after the start of the timer DLTMR2, the above step 1403 is carried out, followed by terminating the present program. Thus, even if the switch A/C SW of the air-conditioning unit has been turned on, the singal indicating that the air-conditioning unit is in operation is not supplied to the ECU 9 before the timer DLTMR 2 has counted up. The ECU 9 controls the operation of the air-conditioning unit 80 and hence the compressor thereof based on the output signal from the terminal $A_{12}$ of the ECCU 15, and in the above case the compressor is not brought into operation to thereby prevent rise in the pressure of the refrigerant of the compressor.

In contrast, if the answer at the step 1407 is Yes, the signal ACS is set to a value of 1 (step 1408), i.e. the signal indicating that the air-conditioning unit is in operation is supplied to the ECU 9, and then it is determined at a step 1409 whether or not the air-conditioning refrigerant pressure switch 81 is ON. If the answer at the step 1409 is No, i.e. the refrigerant pressure (discharge pressure) is lower than a predetermined value, the radiator fan 27 is permitted to rotate forward at low speed (step 1410), whereas if the answer at the step 1410 is Yes, i.e. the refrigerant pressure is equal to or higher than the predetermined pressure, the radiator fan 27 is permitted to rotate forward both at high speed (step 1411) and at low speed (step 1412), followed by terminating the present program.

As described above, according to this embodiment of the invention, the engine room air-cooling system, which is equipped with the radiator fan 27 capable of being driven for reverse rotation after stoppage of the engine 1, and the condenser fan of the air-conditioning unit which is driven cooperatively with the radiator fan 27, is constructed such that even if the switch of the air-conditioning unit is turned on, the operation thereof is inhibited before the predetermined time period has elapsed after the radiator fan 27 ceases to be driven for reverse rotation, and the radiator fan is capable of being driven for forward rotation at a predetermined speed depending on the refrigerant pressure of the air-conditioning unit after the predetermined time period has elapsed. Therefore, although it takes time before the direction of the rotation of the radiator fan 27, which has been driven for reverse rotation so as to exhaust hot air from the engine room, is actually changed to the forward rotation, the rise in the refrigerant pressure of the compressor due to delayed forward rotation of the radiator fan 27 can be prevented since the operation of the air-conditioning unit is inhibited before the predetermined time period has elapsed, and further, after the lapse of the predetermined time period, the radiator fan 27 and the compressor can be properly driven depending on the refrigerant pressure of the compressor of the air-conditioning unit to thereby achieve effective air-cooling of the engine room.

What is claimed is:

1. A control system for controlling the cooling of an engine room accommodating an engine, comprising:
   first detecting means for detecting stoppage of said engine;
   cooling fan means arranged in said engine room for cooling same, said cooling fan means comprising a first cooling fan arranged at a first location in said engine room for cooling said engine, and a second cooling fan arranged at a second location in said engine room;
   second detecting means for detecting a temperature of said engine; and
   control means for operating said cooling fan means when said first detecting means has detected the stoppage of said engine and at the same time the temperature of said engine detected by said second detecting means is higher than a predetermined value, in a manner such that said control means causes one of said first and second cooling fans to be driven for rotation in a direction such that air is discharged from said engine room to the outside thereof, and the other of said first and second cooling fans in a direction such that air is introduced into said engine room from the outside thereof.

2. A control system according to claim 1, including a timer for determining whether or not a predetermined time period has elapsed after stoppage of said engine, and wherein said control means operates said cooling fan means over said time period determined by said timer.

3. A control system according to claim 1 or claim 2, wherein said second detecting means detects the temperature of lubricating oil in said engine as said temperature of said engine.

4. A control system according to claim 1 or claim 2, wherein said second detecting means detects the temperature of coolant in said engine as said temperature of said engine.

5. A control system according to claim 1, wherein said second detecting means detects both the temperature of coolant in said engine and the temperature of lubricating oil in said engine as said temperature of said engine.

6. A control system according to claim 1 or claim 2, wherein said first cooling fan is a radiator fan for cooling said engine.

7. A control system according to claim 1, wherein said first cooling fan is disposed to be selectively driven for rotation either at a predetermined high speed or at a predetermined low speed, said control means causing said first cooling fan to be driven for rotation at said predetermined low speed after stoppage of said engine.

8. A control system for controlling the cooling of an engine room accommodating an engine, comprising:
   first detecting means for detecting stoppage of said engine;
   cooling fan means arranged in said engine room for cooling same, said cooling fan means comprising a first cooling fan arranged at a first location in said engine room for cooling said engine, and a second cooling fan arranged at a second location in said engine room;
   second detecting means for detecting a temperature of said engine;
   control means for operating said cooling fan means when said first detecting means has detected the stoppage of said engine and at the same time the temperature of said engine detected by said second detecting means is higher than a predetermined value, wherein said control means causes one of said first and second cooling fans to be driven for rotation in a direction such that air is discharged from said engine room to the outside thereof, and the other of said first and second cooling fans in a direction such that air is introduced into said engine room from the outside thereof; and
   a timer for determining whether or not a predetermined time period has elapsed after stoppage of said engine, and wherein said control means operates said cooling fan means over said time period determined by said timer.

9. A control system according to claim 8 or 7, wherein said first cooling fan of said cooling fan means is a radiator fan for cooling said engine.

10. A control system for controlling the cooling of an engine room accommodating an engine, comprising:
    first detecting means for detecting stoppage of said engine;
    cooling fan means arranged in said engine room for cooling same;
    second detecting means for detecting a temperature of said engine;
    a timer for determining whether or not a predetermined time period has elapsed after stoppage of said engine, and wherein said control means operates said cooling fan means over said time period determined by said timer; and
    control means for operating said cooling fan means when said first detecting means has detected the stoppage of said engine and at the same time the temperature of said engine detected by said second detecting means is higher than a predetermined value, wherein said control means causes said cooling fan means to be driven for rotation irrespective of whether or not the temperature of said engine is higher than said predetermined value, when said engine has been restarted and stopped again before said predetermined time period elapses after said timer has been started.

11. A control system according to claim 10, wherein said control means causes said cooling fan means to be stopped either when said predetermined time period has elapsed or when the temperature of said engine has become lower than a second predetermined value lower than said predetermined value.

12. A control system for controlling the cooling of an engine room accommodating an engine, comprising:
    first detecting means for detecting stoppage of said engine;
    cooling fan means arranged in said engine room for cooling same;
    second detecting means for detecting a temperature of said engine;
    control means for operating said cooling fan means when said first detecting means has detected the stoppage of said engine and at the same time the temperature of said engine detected by said second detecting means is higher than a predetermined value; and a timer for determining whether or not a predetermined time period has elapsed after stoppage of said engine, and wherein said control means operates said cooling fan means over said time period determined by said timer, wherein said control system is associated with an air-conditioning unit, said air-conditioning unit having a condenser fan arranged in said engine room, a switch being closable for turning on said air-conditioning unit, and a compressor;

said cooling fan means comprising a cooling fan capable of being selectively driven for forward and reverse rotation, said condenser fan being interconnected with said cooling fan for rotation together therewith;

said control means including means for causing said cooling fan to be driven for forward rotation during operation of said engine and causing same to be driven for reverse rotation during stoppage of said engine, and means for inhibiting operation of said air-conditioning unit responsive to closing of said switch of said air-conditioning unit until a predetermined time period elapses after stoppage of reverse rotation of said cooling fan, even if said switch of said air-conditioning unit has been closed, during transition from reverse rotation of said cooling fan to forward rotation thereof when said engine is restarted after stoppage thereof.

13. A control system according to claim 12, wherein said control means includes means for causing said cooling fan to be driven for forward rotation at a speed depending on the pressure of refrigerant in said compressor of said air-conditioning unit, after said predetermined time period has elapsed.

14. A control system according to claim 12 or claim 13, where in said cooling fan is a radiator fan.

15. A control system according to claim 13, wherein said control means causes said cooling fan to be driven for forward rotation at a higher speed as the pressure of said refrigerant in said compressor of said air-conditioning unit is higher.

16. A control system for controlling the cooling of an engine room accommodating an engine, comprising:

first detecting means for detecting stoppage of said engine;

cooling fan means arranged in said engine room for cooling same, said cooling fan means comprising a first cooling fan arranged at a first location in said engine room for cooling said engine, and a second cooling fan arranged at a second location in said engine room, wherein said first cooling fan is a radiator fan for cooling said engine;

second detecting means for detecting a temperature of said engine; and control means for operating said cooling fan means when said first detecting means has detected the stoppage of said engine and at the same time the temperature of said engine detected by said second detecting means is higher than a predetermined value, said control means causing said radiator fan to be driven for rotation in a direction such that air is discharged from said engine room to the outside thereof.

17. A control system according to claim 16 including a timer for determining whether or not a predetermined time period has elapsed after stoppage of said engine, and wherein said control means operates said cooling fan means over said time period determined by said timer.

* * * * *